US010686483B2

(12) United States Patent
Griffin, II et al.

(10) Patent No.: US 10,686,483 B2
(45) Date of Patent: *Jun. 16, 2020

(54) ACCESSORY DEVICE HAVING A RETAINING FEATURE

(71) Applicant: Apple Inc., Cupertino, CA (US)

(72) Inventors: James G. Griffin, II, Sunnyvale, CA (US); Daniel J. Coster, San Francisco, CA (US); Samuel Gilkison Smith, San Francisco, CA (US); Yoonhoo Jo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,456

(22) Filed: Feb. 14, 2019

(65) Prior Publication Data
US 2019/0181905 A1    Jun. 13, 2019

Related U.S. Application Data

(63) Continuation of application No. 15/673,357, filed on Aug. 9, 2017, which is a continuation of application (Continued)

(51) Int. Cl.
H04B 1/3888    (2015.01)
A45C 11/00    (2006.01)
(Continued)

(52) U.S. Cl.
CPC ............ *H04B 1/3888* (2013.01); *A45C 11/00* (2013.01); *G06F 1/1626* (2013.01); *A45C 11/34* (2013.01);
(Continued)

(58) Field of Classification Search
CPC ........ A45F 2005/006; A45F 2200/0516; A45F 2200/0525; A45F 5/00; G06F 1/1656; G06F 2200/1632; G06F 2200/1633; H04M 1/0279; H04M 1/0281; H04M 1/0283; H04M 1/0285
See application file for complete search history.

(56) References Cited

U.S. PATENT DOCUMENTS 5,105,338 A    4/1992 Held
5,737,412 A    4/1998 Yamashita
(Continued)

Primary Examiner — Adrian S Wilson
(74) Attorney, Agent, or Firm — Dickinson Wright RLLP

(57) ABSTRACT

An accessory device for use with an electronic device is disclosed. The accessory device may include multiple layers. One layer may be formed from a plastic. Other layers may include a fabric layer and a silicone layer. The accessory device may further include a retaining feature designed to hold or carry an object, such as a stylus for use with the electronic device. The accessory device may include a recessed region suited to receive the retaining feature. This allows the retaining feature to be stored in the accessory device when the retaining feature is not in use. Further, the retaining feature may be co-planar with an interior region of the accessory device such that the electronic device is not disturbed when positioned in the accessory device. In this manner, the retaining feature may be hidden. Also, the retaining feature may be deployed from the recessed region and receive the object.

20 Claims, 14 Drawing Sheets

Related U.S. Application Data

No. 14/836,903, filed on Aug. 26, 2015, now Pat. No. 9,762,278.

(51) Int. Cl.
  *G06F 1/16* (2006.01)
  *A45C 11/34* (2006.01)

(52) U.S. Cl.
  CPC .............. *A45C 2011/003* (2013.01); *G06F 2200/1632* (2013.01); *G06F 2200/1633* (2013.01); *G06F 2200/1634* (2013.01)

(56) References Cited

U.S. PATENT DOCUMENTS

| | | |
|---|---|---|
| 6,200,056 B1 | 3/2001 | Jordin et al. |
| 6,295,198 B1 | 9/2001 | Loh et al. |
| 6,356,442 B1 | 3/2002 | Lunsford |
| 6,356,443 B2 | 3/2002 | Jenks et al. |
| 7,495,895 B2 | 2/2009 | Carnevali |
| 7,623,121 B2 | 11/2009 | Dodge |
| D623,638 S | 9/2010 | Richardson et al. |
| 8,014,133 B2 | 9/2011 | Dong et al. |
| 8,223,480 B2 | 7/2012 | Dong |
| 8,224,404 B2 | 7/2012 | Yang et al. |
| 8,251,210 B2 | 8/2012 | Schmidt et al. |
| 8,374,657 B2 | 2/2013 | Interdonato |
| 8,428,664 B1 | 4/2013 | Wyers |
| 8,485,404 B2 | 7/2013 | Monaco et al. |
| 8,567,832 B2 | 10/2013 | Kannaka |
| 8,746,448 B1 * | 6/2014 | Bellace ............ A45F 5/00 206/320 |
| 8,759,675 B2 | 6/2014 | Rajeswaran et al. |
| D711,866 S | 8/2014 | Kawata |
| 8,867,201 B2 | 10/2014 | Lin et al. |
| 8,939,483 B2 | 1/2015 | Kim |
| 8,989,826 B1 | 3/2015 | Connolly |
| 9,762,278 B2 * | 9/2017 | Griffin, II ............ H04B 1/3888 |
| 9,971,379 B2 * | 5/2018 | Griffin, II ............ G06F 1/1607 |
| 10,243,609 B2 * | 3/2019 | Griffin, II ............ H04B 1/3888 |
| 2002/0101411 A1 | 8/2002 | Chang |
| 2003/0002248 A1 | 1/2003 | Nakaya et al. |
| 2004/0144819 A1 | 7/2004 | Huang |
| 2005/0205623 A1 | 9/2005 | Buntain |
| 2006/0138182 A1 | 6/2006 | Carlsson |
| 2006/0226040 A1 | 10/2006 | Medina |
| 2006/0244737 A1 | 11/2006 | Dodge |
| 2009/0270050 A1 | 10/2009 | Brown |
| 2010/0084291 A1 | 4/2010 | Dayton et al. |
| 2010/0092234 A1 | 4/2010 | Zhang et al. |
| 2010/0294683 A1 | 11/2010 | Mish et al. |
| 2011/0031287 A1 | 2/2011 | Le Gette et al. |
| 2011/0136555 A1 | 6/2011 | Ramies et al. |
| 2011/0163642 A1 * | 7/2011 | Rohrbach ............ A45C 9/00 312/223.1 |
| 2011/0266316 A1 | 11/2011 | Ghalib et al. |
| 2011/0290687 A1 | 12/2011 | Han |
| 2011/0297581 A1 | 12/2011 | Angel |
| 2012/0008269 A1 | 1/2012 | Gengler |
| 2012/0024917 A1 | 2/2012 | Case et al. |
| 2012/0048873 A1 | 3/2012 | Hyseni |
| 2012/0068832 A1 | 3/2012 | Feldstein et al. |
| 2012/0069540 A1 | 3/2012 | Lauder et al. |
| 2012/0085679 A1 | 4/2012 | Kim et al. |
| 2012/0205277 A1 | 8/2012 | Chang |
| 2012/0247989 A1 | 10/2012 | Cooper |
| 2012/0267402 A1 | 10/2012 | Beatty |
| 2012/0268891 A1 | 10/2012 | Cencioni |
| 2012/0325838 A1 | 12/2012 | Huang |
| 2013/0042581 A1 | 2/2013 | Holben et al. |
| 2013/0049345 A1 | 2/2013 | Imbemino |
| 2013/0100055 A1 | 4/2013 | Lauder et al. |
| 2013/0119093 A1 | 5/2013 | Interdonato |
| 2013/0146625 A1 | 6/2013 | Karle et al. |
| 2013/0292530 A1 * | 11/2013 | Dang ............ G06F 1/1656 248/229.2 |
| 2014/0084034 A1 | 3/2014 | Wangercyn, Jr. et al. |
| 2014/0104771 A1 | 4/2014 | Colan |
| 2017/0060180 A1 * | 3/2017 | Griffin, II ............ G06F 1/1607 |
| 2017/0063419 A1 | 3/2017 | Griffin, II et al. |
| 2017/0338845 A1 | 11/2017 | Griffin, II et al. |

* cited by examiner

ACCESSORY DEVICE HAVING A RETAINING FEATURE

CROSS-REFERENCE TO RELATED APPLICATIONS

The present application is a continuation of U.S. patent application Ser. No. 15/673,357, filed Aug. 9, 2017, entitled "ACCESSORY DEVICE HAVING A RETAINING FEATURE," which is a continuation of U.S. application Ser. No. 14/836,903, filed Aug. 26, 2015, entitled "ACCESSORY DEVICE HAVING A RETAINING FEATURE", now U.S. Pat. No. 9,762,278 issued Sep. 12, 2017, the contents of which are incorporated herein by reference in their entirety for all purposes.

FIELD

The described embodiments relate to an accessory device. In particular, the described embodiments relate to an accessory device having a retaining feature designed to retain an object. The retaining feature may be stored either fully or partially within the accessory device or deployed to retain the object. The retaining feature may also be a detachable retaining feature designed to disengage from the accessory device.

BACKGROUND

Accessory devices used in conjunction with electronic devices are known. In some cases, the electronic device includes a display having touch screen capability that includes one or more sensors designed to receive a gesture in response to a touch input to the display. This may be performed by a finger of a user or by an object. Regarding the latter, accessory devices generally do not include a means for receiving the object. This may result in losing the object.

SUMMARY

In one aspect, an accessory device suitable for carrying an electronic device is described. The accessory device may include a shell that defines a size and a shape corresponding to the electronic device. Also, the shell may include a recessed region. The accessory device may further include an outer layer covering an exterior region of the shell. The accessory device may further include an inner layer covering an interior region of the shell and disposed in the recessed region, the inner layer comprising an opening in a location corresponding to the recessed region. The accessory device may further include a retaining feature comprising a material extending through the opening. In some embodiments, the retaining feature is configured to move from a stored configuration, in which the retaining feature is disposed in the recessed region, to a deployed position, in which the retaining feature extends away from the shell to receive an object.

In another aspect, an accessory device suitable for carrying an electronic device is described. The accessory device may include a first layer that defines a size and a shape of the electronic device. The accessory device may further include a second layer disposed over the first layer. The second layer may engage the electronic device when the electronic device is installed in the accessory device. The accessory device may further include a retaining feature capable of receiving an object. The retaining feature may extend through an opening of the second layer and may be partially disposed between the first layer and the second layer.

In another aspect, a system is described. The system may include a tablet device. The system may further include an accessory device capable of receiving the tablet device between a first sidewall and a second sidewall. The accessory device may include a retaining feature that includes a material that extends along the first sidewall and an interior region of the accessory device. In some embodiments, the retaining feature is configured to move from a stored configuration, in which the retaining feature is disposed between the tablet device and the interior region and hidden from view, to a deployed configuration, in which the retaining feature extends away from the first sidewall.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
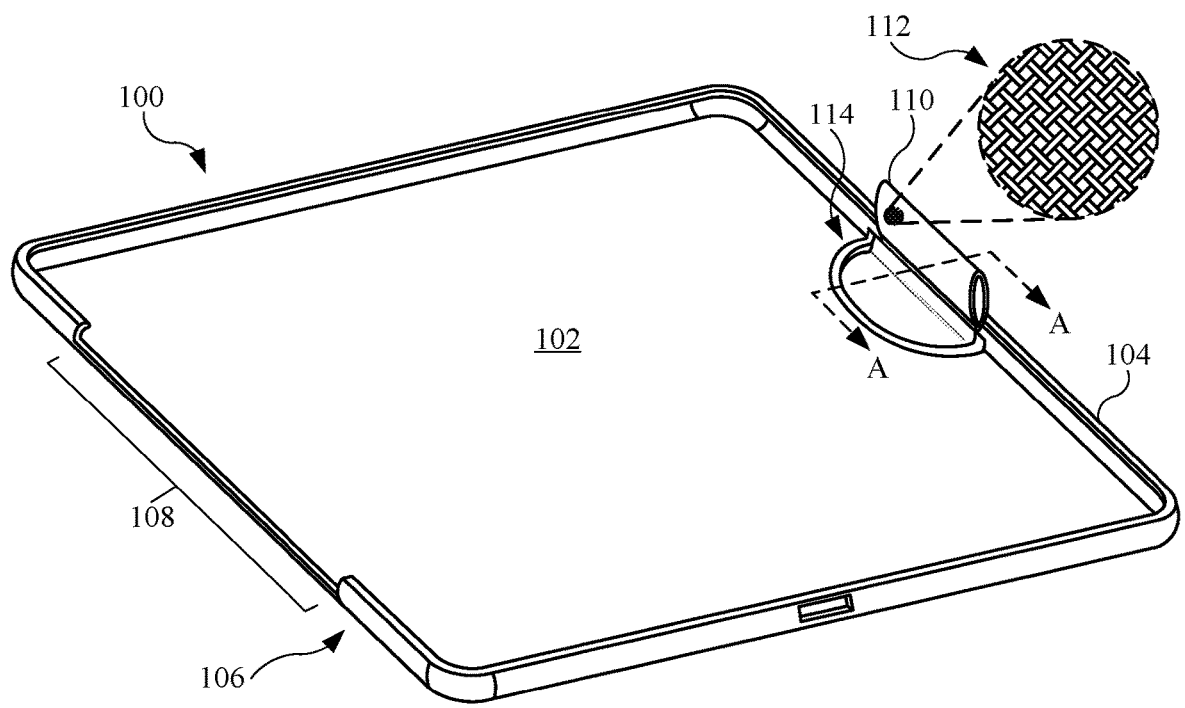
FIG. 1 illustrates an isometric view of an embodiment of an accessory device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate to an accessory device suitable for use with an electronic device, such as a smart phone or a tablet computing device. The accessory device may include several features not only designed to provide a protective cover to the electronic device, but also to store an object that may be used with the electronic device.

As an example, in some embodiments in this detailed description, the accessory device includes a retaining feature arranged to retain an object that can be used to interact with the electronic device. For example, the retaining feature can take the form of a loop feature secured with the accessory device. The loop feature can further take the form of a closed loop feature formed of a material that defines an interior volume with a cross section having an approximate size and shape of the object. In some cases, the material can be "stretchable" such that the cross section is somewhat smaller than that of the object. In this situation, insertion of the object into the interior volume defined by the loop causes the stretchable material to grasp the object with a retaining force that depends upon the size and shape of the object and elastic properties of the stretchable material. An advantage of this arrangement is that objects of varying sizes and shapes can be accommodated by the closed loop feature limited only the by the elasticity of the stretchable material. Accordingly, the retaining feature may be formed from one or more materials, some of which are stretchable or elastic, or include other materials that may be more rigid in nature giving the closed loop a fixed size and shape (however, the rigid nature of the material may preclude the closed loop feature from being fully stored within accessory device). For example, the loop feature may be formed of a woven fabric designed to minimize or prevent tearing up to an elastic limit of the woven fabric. The woven fabric may be coated or laminated with a material, such as a polymeric material including polyurethane, designed to enhance an appearance of the retaining feature. Further, the material may not only provide a particular color to the retaining feature but may also simulate or mimic a look and feel of the accessory device. In addition, the woven fabric may be a stretch woven fabric designed stretch in response to a force applied to the woven fabric (and the polymeric material) to increase a dimension of the retaining feature. Also, the retaining feature may conform to receive an object, such as a stylus.

When the retaining feature is not in use, the retaining feature is designed to tuck away in the accessory device. Further, when the electronic device is disposed in the accessory device, the retaining feature may be stored in a manner such that the retaining feature is hidden from view. Also, the accessory device may include a recessed region that receives the retaining feature such that when the electronic device is disposed in the accessory device, the retaining feature does not cause the electronic device to protrude from the accessory device in an undesired manner.

Also, the accessory device may include a layer, such as a fabric layer, that provides a soft layer that will not damage the electronic device. Further, the layer may cover the retaining feature in a location of the retaining feature associated with material of the retaining feature secured with the accessory device. Also, the material forming the retaining feature may extend through an opening, or slit, in the layer. This allows for a smooth interior of the accessory device that covers, for example, one or more adhesive layers that adhesive secure the retaining feature with the accessory device.

Other configurations of the accessory device are shown and described. For example, in some cases, the accessory device may be designed to cover a display of the electronic device rather than an enclosure. In these embodiments, the accessory device may still include a retaining feature. However, the retaining feature may include one or more variations. For example, the retaining feature may be magnetically coupled with the accessory device. Also, the retaining feature may be stored or deployed in the accessory device. In other embodiments, the retaining feature may not only be magnetically coupled with the accessory device, but may also be designed to completely decouple, or detach, from the accessory device. The retaining feature may, at a later time, magnetically recouple with the accessory device.

Other accessory devices are shown and described. For example, the accessory device may be a keyboard designed to communicate with an electronic device and input a control to the electronic device. Also, the accessory device may further couple with other accessory devices.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with the described embodiments. The accessory device 100 may be suitable for use with an electronic device (not shown), such as a smart phone or a tablet device generally known in the art. For example, the accessory device 100 may include a rear portion 102 designed to receive an enclosure of the electronic device of a suitable size and shape. The rear portion 102 may be formed from one or more layers (described below). Several sidewalls, including a first sidewall 104 and a second sidewall 106 opposite the first sidewall 104, may extend from the rear portion 102 and provide a retaining force to secured an electronic device within the accessory device 100. In particular, the first sidewall 104 and the second sidewall 106 may be designed to include a curved, or folded, configuration corresponding to a curved region of an enclosure of an electronic device. Also, as shown in FIG. 1, the second sidewall 106 may include a cut out region 108 defined as a region free of the material forming the second sidewall 106. The cut out region 108 may be used to receive part of another accessory device (for example, a cover) described later. Further, the cut out region 108 may allow the accessory device 100 to bend or flex in a region proximate to the cut out region 108 and to facilitate extraction of an electronic device disposed in the accessory device 100. Also, although not shown, in some embodiments, the second sidewall 106 does not include a cut out region 108, and the second sidewall 106 extends lengthwise to opposing sidewalls.

In some cases, the electronic device may include a display arranged to display visual content. Generally speaking, the display includes a display layer or panel that presents the visual content overlaid by an outer protective layer. The outer protective layer is generally transparent so as to not impede viewing of the visual content and affords protection against events (such as an impact, scratch, moisture intrusion). In some cases, the display can be touch capable. In other words, a touch event at or near the outer protective layer can be used as to control certain aspects of the electronic device thereby allowing a user to interact with the electronic device by, for example, touching or near touching the outer protective layer of the display to activate one or more capacitive touch sensors integrated with the display. The means for interacting with the display may include touching (or near touching) the touch screen with a finger or using an object, such as a stylus that can be detected by the touch screen.

Regarding the latter, the accessory device 100 may include a retaining feature 110 designed to receive and carry the object. In some embodiments, the retaining feature 110 includes a loop feature, as shown in FIG. 1. Further, the retaining feature 110 in FIG. 1 is a closed loop feature. The retaining feature 110 may be formed from one or more materials. For example, the enlarged view shows the retaining feature including a material in a woven configuration 112. The material may include polyester, rayon, spandex, cotton, or a combination thereof. In this manner, the retaining feature 110 may include stretchable and/or elastic properties allowing the retaining feature 110 to expand to receive an object as well as contract to conform around the object. Also, the material may include an additional material laminated with the material in the woven configuration 112. For example, the additional material may include a polymeric material, such as a polyurethane, designed to include an appearance similar to that of the accessory device 100, and in particular, an outermost layer of the accessory device 100. This will be described below.

As shown in FIG. 1, the retaining feature 110 is in a deployed configuration defined as a configuration that allows an object to slide through the retaining feature 110. However, in some cases, the retaining feature 110 may not be used. In this regard, the accessory device 100 may further include a recessed region 114 designed to receive the retaining feature 110 to define a stored configuration of the retaining feature 110. This will be described below. In some embodiments, the recessed region 114 extends along the rear portion 102. In the embodiment shown in FIG. 1, the recessed region 114 extends into both the rear portion 102 and the first sidewall 104 of the accessory device 100.

Figure 2:
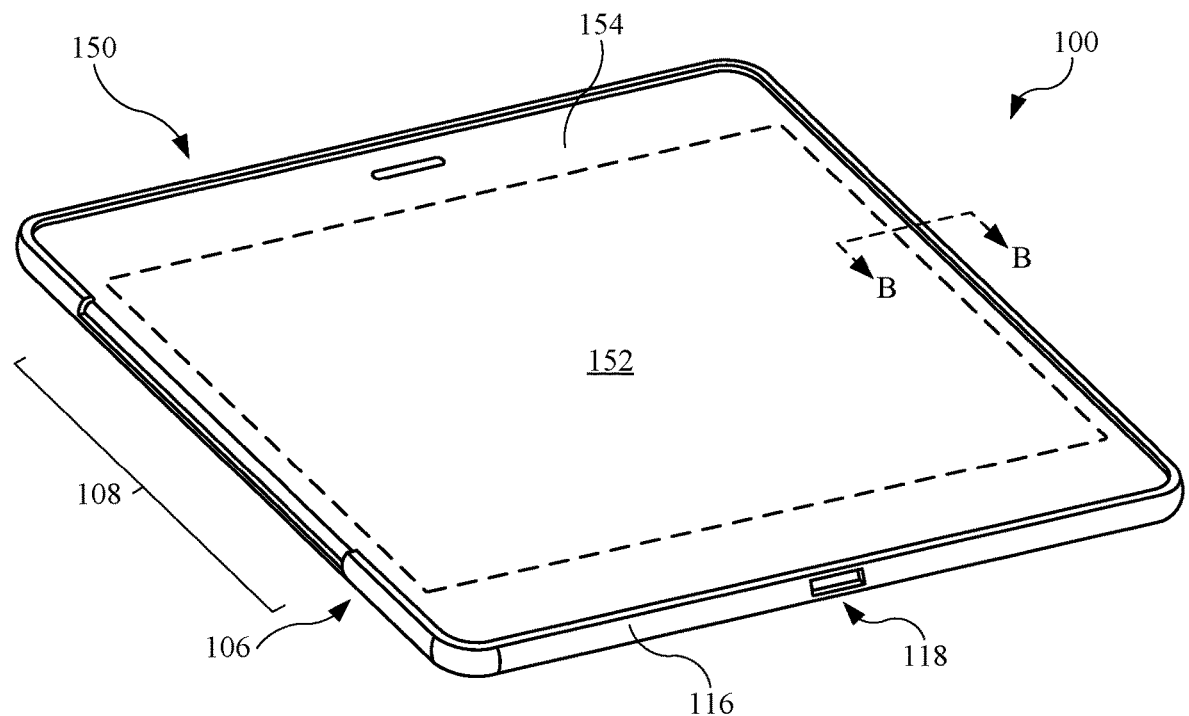
FIG. 2 illustrates an isometric view of the accessory device shown in FIG. 1, with the accessory device having an electronic device disposed in the accessory device.

FIG. 2 illustrates an isometric view of the accessory device 100 shown in FIG. 1, with the accessory device 100 having an electronic device 150 disposed in the accessory device 100. Accordingly, as shown, the accessory device 100 may have a size and a shape designed to receive the electronic device 150. Also, the electronic device 150 may include a display assembly having a display panel suitable for presenting visual content. As shown in FIG. 2, the display assembly 152 is overlaid by outer protective layer 154 that is generally transparent in nature so as to not impede viewing of the visual content. In some embodiments, the outer protective layer 154 is a cover glass extends throughout a front face of the electronic device 150. Also, in some embodiments, the display assembly 152 includes a touch sensitive layer capable of detecting a touch event or near the outer protective layer 154. In this way, the electronic device 150 can interpret a touch event in any number of ways. For example, the electronic device 150 can interpret a touch event as a single or multipoint event (caused by one or more non-moving detectable objects such as a finger or stylus) or as a gesture when one or more of the detectable objects move with respect to the outer protective layer 154. In any case, the electronic device 150 can interpret the touch event(s) as a command that can be used to alter a current or subsequent operation of the electronic device.

It should be noted that in FIG. 2, the retaining feature 110 (shown in FIG. 1) can be hidden from view in a stored configuration defined by the retaining feature 110 positioned between the accessory device 100 and the electronic device 150. The stored configuration may be used when, for example, an object is not used in conjunction with the electronic device 150. Alternatively, the stored configuration is useful to prevent the retaining feature 110 for tangling with another object or structure near the accessory device 100. In this regard, the retaining feature 110 may be referred to as a foldable loop feature, as the retaining feature 110 may fold into a stored configuration, and unfold to a deployed configuration. Alternatively, the retaining feature 110 may be in a deployed configuration, as shown in FIG. 1, when, for example, the electronic device 150 is positioned in the accessory device 100.

Also, as shown in FIG. 2, the accessory device 100 may include an opening aligned with a feature of the electronic device 150. For example, the accessory device 100 may include a third sidewall 116 having an opening 118 designed to receive an additional accessory, such as a cable accessory for charging of and/or data communication with the electronic device 150. Although not shown, the third sidewall 116 may include several additional openings designed to facilitate use of the electronic device 150. Also, although not shown, the accessory device 100 may further include several protruding features aligned with one or more control inputs (such as buttons) of the electronic device 150. Also, the cut out region 108 of the second sidewall 106 may include a side and a shape to receive one or more features of an additional accessory device. This will be discussed below.

Figure 3:
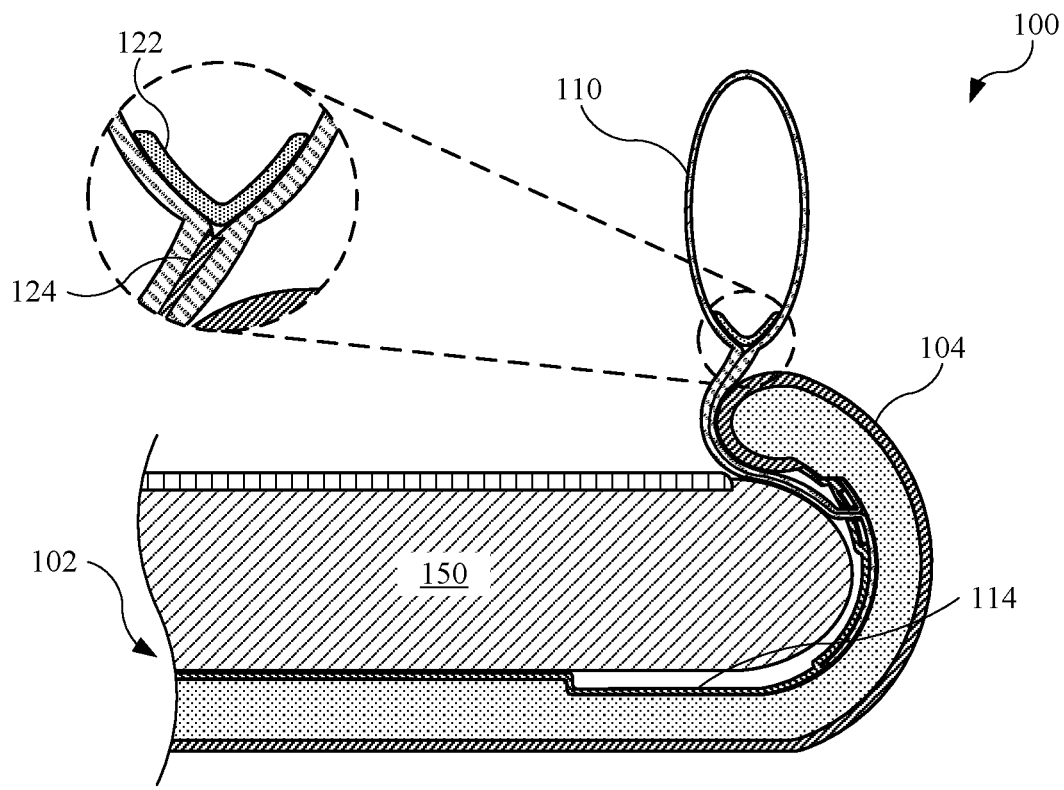
FIG. 3 illustrates a cross sectional view of the accessory device shown in FIG. 1 taken along line A-A.
Figure 4:
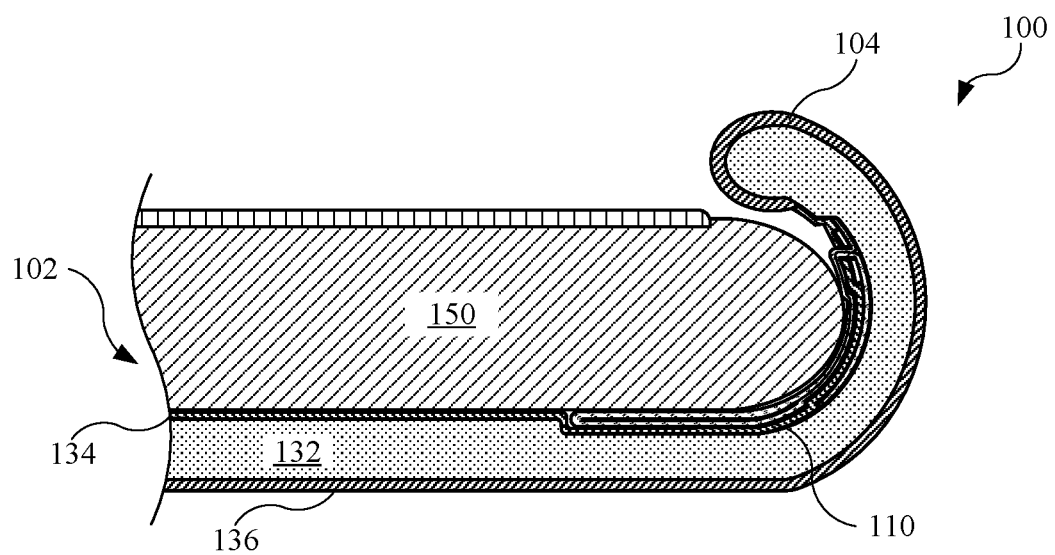
FIG. 4 illustrates a cross sectional view of the accessory device shown in FIG. 2 taken along line B-B.

FIG. 3 illustrates a cross sectional view of the accessory device 100 shown in FIG. 1 taken along line A-A. For purposes of illustration, the electronic device 150 is shown and disposed in the accessory device 100. As shown, the retaining feature 110 is in the deployed configuration and capable of receiving an object. The retaining feature 110 may include material that loops around and is adhesively joined in several locations. For example, the enlarged view shows a retaining feature 110 that includes a first adhesive layer 122 designed to join together two portion of the material that forms the retaining feature 110 at a bottom portion of a loop portion of the retaining feature 110. To further bond the retaining feature 110 together, the retaining feature 110 may include a second adhesive layer 124. Also, the recessed region 114 is shown as an indented or sub-flush region with respect to the rear portion 102 of the accessory device 100. Further, the recessed region 114 is sub-flush with respect to the first sidewall 104. In this manner, the retaining feature 110 may be stored in the recessed region 114 and hidden from view. For example, FIG. 4 illustrates a cross sectional view of the accessory device shown in FIG. 2 taken along line B-B. As shown, the retaining feature 110 is in the stored configuration and disposed in the recessed region 114 (shown in FIG. 3). With the retaining feature 110 stored between the accessory device 100 and the electronic device 150, the retaining feature 110 is hidden from view.

The cross sectional views of FIGS. 3 and 4 further illustrate the various layers used to form the accessory device 100. For example, as shown in FIG. 4, the accessory device 100 may include a first layer 132. The first layer 132 may include a rigid plastic molded to define a size and a shape of the accessory device 100. The first layer 132 may be referred to as a shell. The recessed region 114 may be formed during a molding operation of the first layer 132. Also, the accessory device 100 further includes a second layer 134 disposed on an interior region of the accessory device 100, and in particular the first layer 132 and the recessed region 114. In this regard, the second layer 134 may be referred to as an inner layer. In some embodiments, the second layer 134 includes a fabric layer, such as a microfiber fabric layer. Also, the recessed region 114 is designed such that the retaining feature 110 may be co-planar, or flush, with respect to the rear portion 102 even with the second layer 134 disposed in the recessed region 114. Also, the second layer 134 may extend into the sidewalls, including the first sidewall 104. The accessory device 100 may further include a third layer 136 disposed on an outer region of the first layer 132. In this regard, the third layer 136 may be referred to as an outer layer. The third layer 136 may include a silicone, polyurethane, and/or another polymeric layer. In this manner, the retaining feature 110 may include an appearance similar to that of the third layer 136, with the similar appearance including color, texture, reflectivity, or a combination thereof.

Figure 5:
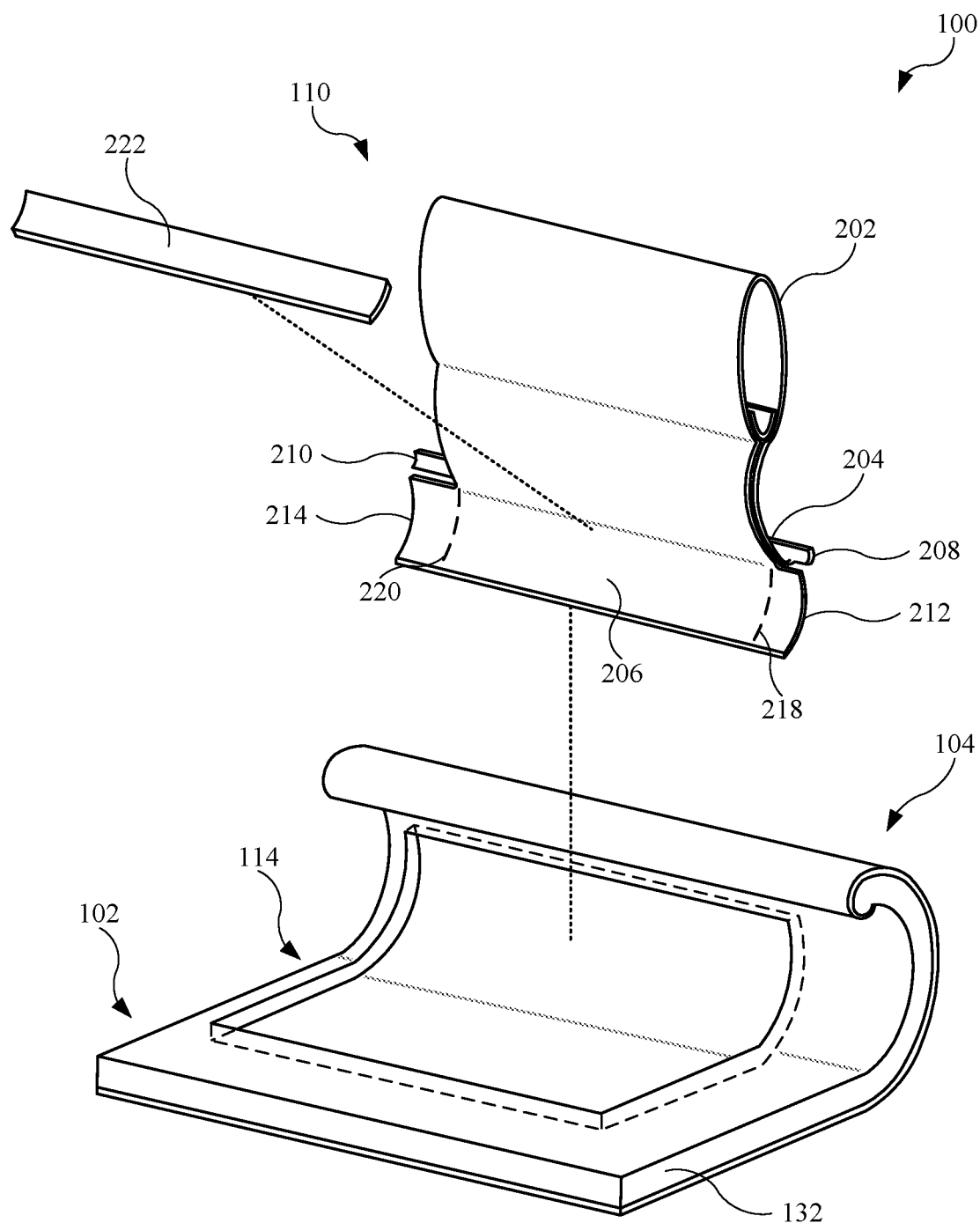
FIG. 5 illustrates an exploded view of the accessory device shown in FIG. 1, with the accessory device enlarged to show the retaining feature, the recessed region, and additional features.

FIG. 5 illustrates an exploded view of the accessory device 100 shown in FIG. 1, with the accessory device 100 enlarged to show the retaining feature 110, the recessed region 114, and other additional features. For purposes of illustration, the second layer 134 (shown in FIG. 4) is removed. As shown, the first layer 132 may be formed in a manner that defines a recessed region 114 used to receive the retaining feature 110 in a stored configuration. The first layer 132 is formed with a size and a shape to accommodate both the second layer 134 as well as the retaining feature 110 such that the retaining feature 110 may be substantially disposed in the recessed region 114. Also, as shown in FIG. 5, the recessed region 114 extends from the rear portion 102 to the first sidewall 104. This allows the recessed region 114 to accommodate the retaining feature 110.

In order for the retaining feature 110 to remain secured with the accessory device 100, the retaining feature 110 may include several feature designed to resist forces pulling the retaining feature 110 away from the accessory device 100. For example, as shown in FIG. 5, the material forming the retaining feature 110 extend beyond a loop feature 202 of the retaining feature 110 to define a first tail feature 204 positioned in the recessed region 114 along the first sidewall 104. The retaining feature 110 may further include a second tail feature 206 extending along the first sidewall 104 in a direction opposite the first tail feature 204. The first tail feature 204 and the second tail feature 206 may be secured in the recessed region 114 by an adhesive (not shown). Also, to provide additional surface area used to further reinforce the retaining feature 110 against tearing or decoupling from the accessory device 100, the material forming the retaining feature 110 may be cur or designed such that both the first tail feature 204 and the second tail feature 206 extend an additional length to define several wing features. For example, the first tail feature 204 may include a first wing feature 208 and a second wing feature 210, and the second tail feature 206 may include a first wing feature 212 and a second wing feature 214. Generally, the first wing features shown and described in FIG. 5 may be defined as material of the first tail feature 204 and the second tail feature 206 that extend beyond the dotted lines 218 and dotted lines 220. With the wing features adhesively secured in the recessed region 114, the retaining feature 110 may further resist against pulling forces applied to, for example, the loop feature 202.

In addition, an adhesive layer 222 may be applied to the retaining feature 110. As shown in FIG. 5, the adhesive layer 222 may be disposed on a portion of the first tail feature 204 and the second tail feature 206 as well as their respective wing features. The adhesive layer 222 may include a polymeric and fiber material designed to provide additional reinforcement against a force that pulls the retaining feature 110 in a direction away from the accessory device 100.

Figure 6:
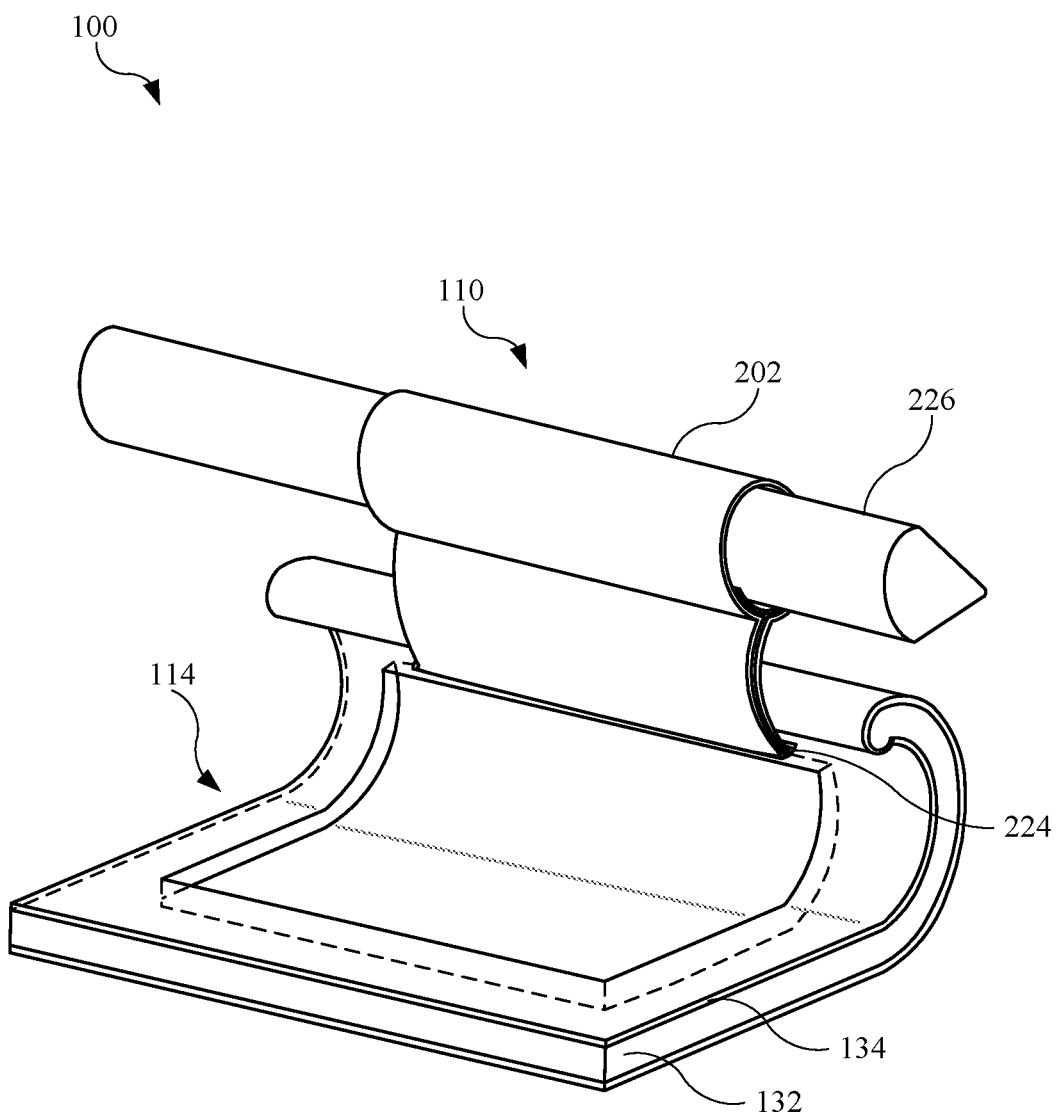
FIG. 6 illustrates an isometric view of the accessory device shown FIG. 5, with the second layer disposed on the first layer including the recessed region.

FIG. 6 illustrates an isometric view of the accessory device 100 shown FIG. 5, with the second layer 134 disposed on the first layer 132 including the recessed region 114. FIG. 6 also represents the retaining feature 110 assembled with the accessory device 100. As shown, the second layer 134 may include an opening 224, or slit, to allow the loop feature 202 of the retaining feature 110 to extend through the second layer 134. Also, this allows the second layer 134 to cover several features of the retaining feature 110 shown in FIG. 5, such as the first tail features, the wing features, and the adhesive. The second layer 134 provides an appearance of a smooth and continuous finish as the second layer 134 may substantially cover the interior region of the accessory device 100.

FIG. 6 further shows the loop feature 202 of the retaining feature 110 carrying an object 226. In some embodiments, the object 226 is a pen or other generally known writing utensil. In the embodiment shown in FIG. 5, the object 226 is a stylus suitable for use with a capacitive touch screen of an electronic device that may be used with the accessory device 100. The stretchable properties of the retaining feature 110 allow the loop feature 202 to expand to receive the object 226. Also, the elastic properties of the retaining feature 110 allow the loop feature 202 to generally conform to a size and a shape of the object 226 to further secure the object with the retaining feature 110.

Figure 7:
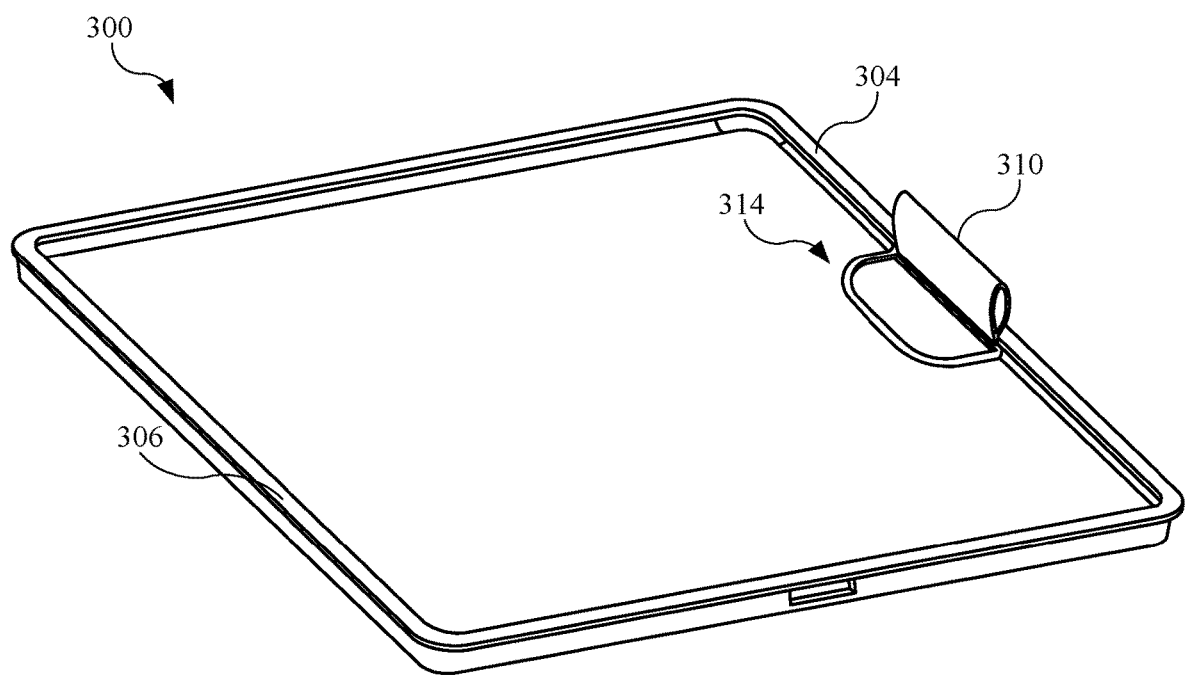
FIG. 7 illustrates an isometric view of an alternate embodiment of an accessory device, in accordance with the described embodiments.

In some instances, the sidewalls of an accessory device may be modified to receive an additional accessory device, such as a cover (shown and described below). For example, FIG. 7 illustrate a variation of an accessory device 300 having flatten sidewalls disposed around the accessory device 300. As shown, the accessory device 300 includes several flattened sidewalls, including a first flattened sidewall 304 and a second flattened sidewall 306. The flattened sidewalls may be well suited to receive, for example, an additional accessory device, such as a cover or a keyboard (shown below). In some embodiments, the second flattened sidewall 306 includes a cut out region previously described. In the embodiment shown in FIG. 7, the second flattened sidewall 306 does not include a cut out region. This allows the second flattened sidewall 306 to continuously cover an edge of an electronic device disposed near the second flattened sidewall 306. Also, similar to a previous embodiment, the accessory device 300 may include a retaining feature 310 and a recessed region 314 designed to receive the retaining feature 310.

Figure 8:
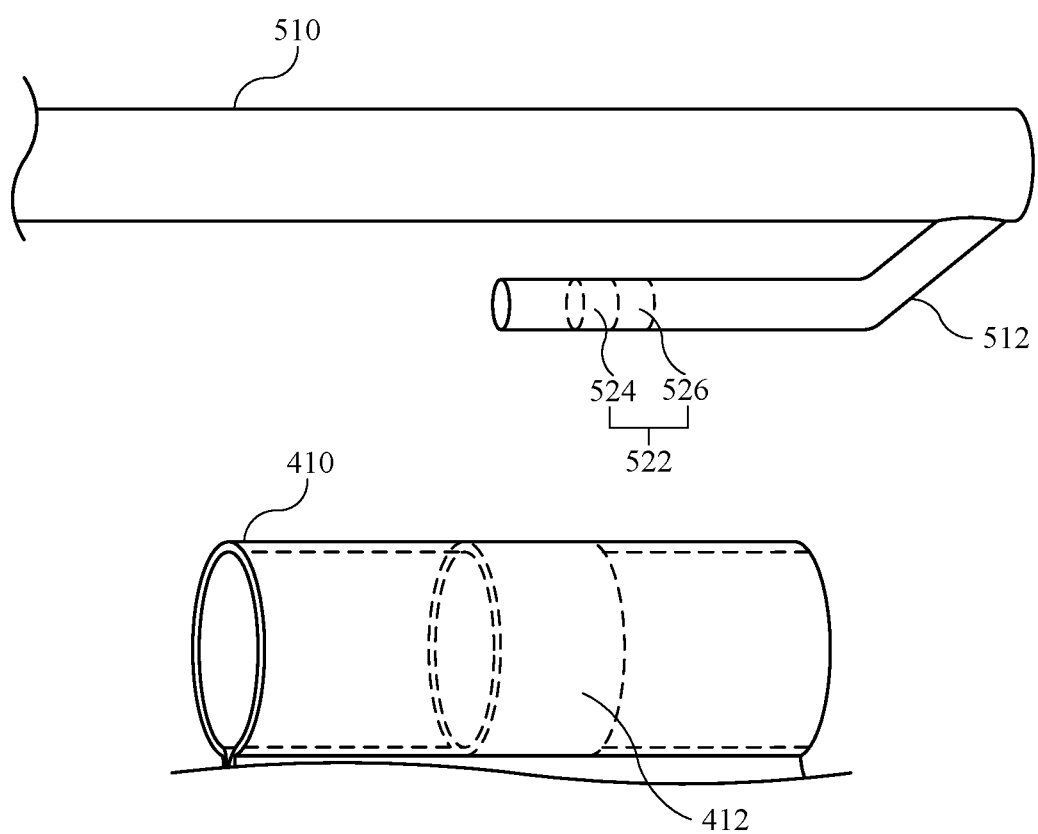
FIG. 8 illustrates an isometric view of a retaining feature having a ring feature used to secure an object with the retaining feature.

While the retaining feature in previous embodiments includes stretchable and/or elastic features, other embodiments of a retaining feature may include additional features. For example, FIG. 8 illustrates an isometric view of a retaining feature 410 having a ring feature 412 used to secure an object 510 with the retaining feature 410. As shown, the ring feature 412 is embedded in the retaining feature 410. In some embodiments, the ring feature 412 is a ferrous material attracted to a magnet. In this regard, the object 510 may include a clip 512 having a magnet 522. In some embodiments, the magnet 522 includes a first portion 524 having a first polarity and a second portion 526 having a second polarity opposite the first polarity. For example, the first portion 524 may include a "North" facing polarity and, accordingly, the second portion 526 may include a "South" facing polarity. When the clip 512 is inserted into the retaining feature 410, the ring feature 412 may magnetically couple with one of the first portion 524 and the second portion 526. Also, in other embodiments, the polarities may be part of a "key" feature. In this manner, the ring feature 412 may determine whether the object 510 should be used with an accessory device that includes the retaining feature 410. For example, the ring feature 412 may be a magnet that magnetically attracts the magnet 522 in the clip 512 when the object 510 may be used with an accessory device having the retaining feature 410. Alternatively, the ring feature 412 may be a magnet that magnetically repels the magnet 522 in the clip 512 when the object 510 may not be used with an accessory device having the retaining feature 410. Accordingly, an accessory device having the retaining feature 410 may be an interactive accessory device, as the accessory device may provide information to the electronic device regarding the object 510. In other embodiments, the object 510 includes a magnet and the clip 512 is removed. In these embodiments, the object 510 may magnetically couple directly with the retaining feature 410. Also, the retaining feature 410 may replace embodiments of a retaining feature throughout this detailed description, such as the retaining feature 110 shown in FIG. 1.

The prior embodiments of an accessory device designed to receive and carry an electronic device. These embodiments offer a protective cover to an enclosure of the device. However, other embodiments of an accessory device may be designed to overlay and protect the display assembly as well as an outer protective layer disposed over the display assembly. In this manner, the accessory device may be a protective cover disposed over the outer protective layer.

Figure 9:
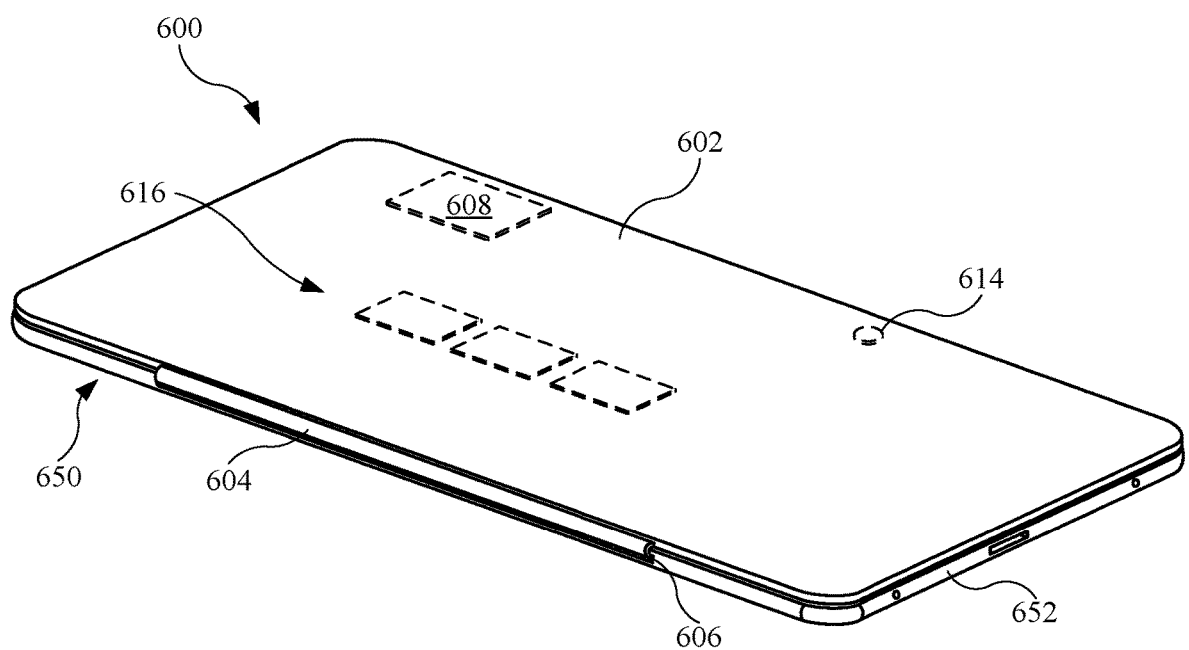
FIG. 9 illustrates a plan view of an embodiment of an accessory device used with an electronic device, in accordance with the described embodiments.

For example, FIG. 9 illustrates an isometric top view of an electronic device 650 presented in terms of tablet device and an accessory device 600 shown as protective cover. The electronic device 650 may include features previously described for an electronic device, such as a display assembly and an outer protective layer overlaying the display assembly (as shown in FIG. 1). The accessory device 600 is positioned over the electronic device 650 such that the accessory device 600 overlays an outer protective layer (not shown) of the electronic device 650. The electronic device 650 can include a housing 652 that can enclose and support several internal components (including integrated circuit chips and other circuitry) to provide computing operations for the electronic device 650. In order to not interfere with the magnetic field generated the magnet used to couple the accessory device 600, at least that portion of the housing 652 nearest the magnet can be formed of any number of non-magnetic materials such as plastic or non-magnetic metal such as aluminum.

The accessory device 600 may include an appearance (for example, a look and feel) that complements that of the electronic device 650 adding to overall look and feel of the electronic device 650. The accessory device 600 may include a flap 602. In some embodiments, the flap 602 includes a size and shape in accordance with the outer protective layer (not shown) of the electronic device 650. Also, the flap 602 can be pivotally connected with the electronic device 650 way of a hinge assembly 604 shown in FIG. 9. Further, the connection means between the hinge assembly 604 and the electronic device 650 may include a metal (not shown), such as steel, or other ferrous material embedded in an attachment feature 606 of the hinge assembly 604. In this manner, the electronic device 650 may include a magnet disposed in the electronic device 650 that allows the accessory device 600 to magnetically couple with the electronic device by way of the attachment feature 606.

The magnetic attachment force between the attachment feature 606 and magnet can maintain the accessory device 600 and electronic device 650 in a proper orientation and placement vis-a-vis the flap 602. By "proper orientation" it is meant that the accessory device 600 can only properly attach with the electronic device 650 with the flap 602 and outer protective layer aligned in a mating engagement defined by the flap 602 covering substantially all of outer protective layer when the flap 602 is placed in contact with the cover glass of the electronic device 650.

The flap 602 can be formed of various materials such as plastic, cloth, and so forth. In some embodiments (not shown), the flap 602 can be segmented in such a way that a segment of the flap 602 can be lifted to expose a corresponding portion of the display assembly of the electronic device 650. However, the flap 602 is designed to bend or fold without segmented regions. Also, the flap 602 can also include a functional element that can cooperate with a corresponding functional element in electronic device 650.

In this way, manipulating the flap 602 can result in an alteration in the operation of electronic device 650.

The flap 602 can include magnetic material. For example, as shown in FIG. 9, the flap 602 includes a first magnetic element 608, which can be used to magnetically attach to a corresponding magnetic attachment (feature not shown) in the electronic device 650. Also, the flap may further include a second magnetic element 614 that can be used to activate Hall Effect sensor (not shown) disposed in the electronic device 650. In this manner, when the flap 602 is positioned above the Hall Effect sensor, the Hall Effect sensor can respond by generating a signal that can, in turn, be used to alter an operating state of electronic device 650. Since the outer protective cover can be easily attached directly to the housing of the tablet device without fasteners, the flap 602 can essentially conform to the shape of electronic device 650. In this way, the accessory device 600 will not detract or otherwise obscure the look and feel of electronic device 650. The flap 602 can also include capacitive elements 616 arranged in a defined pattern. The capacitive elements 616 can be detected by a multi-touch (MT) sensitive layer (not shown) incorporated in the display assembly. When the flap 602 is placed upon the cover glass, the MT sensitive layer can respond to the presence of the capacitive elements 616 by generating a touch pattern consistent with the defined pattern. The defined pattern can be used to convey information to the electronic device 650. The information can include, for example, aspects and characteristics of accessory device 600 such as color, type, style, serial number, and so forth.

Figure 11:
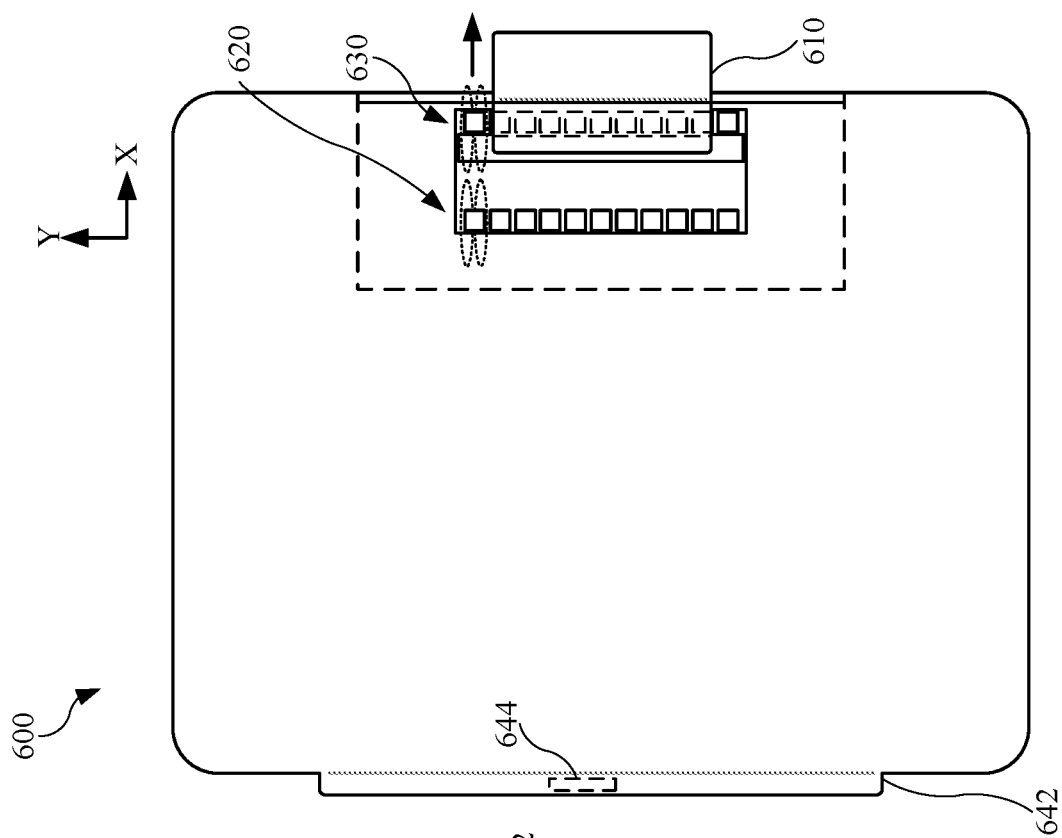
FIG. 11 illustrates a plan view of the accessory device shown in FIG. 9, with the retaining feature in a deployed configuration.

The accessory device 600 may include several additional features. For example, FIGS. 10 and 11 illustrates the accessory device 600 having a retaining feature 610 designed to carry an object suitable for use with an electronic device, such as the electronic device 650 (shown in FIG. 9).

Figure 10:
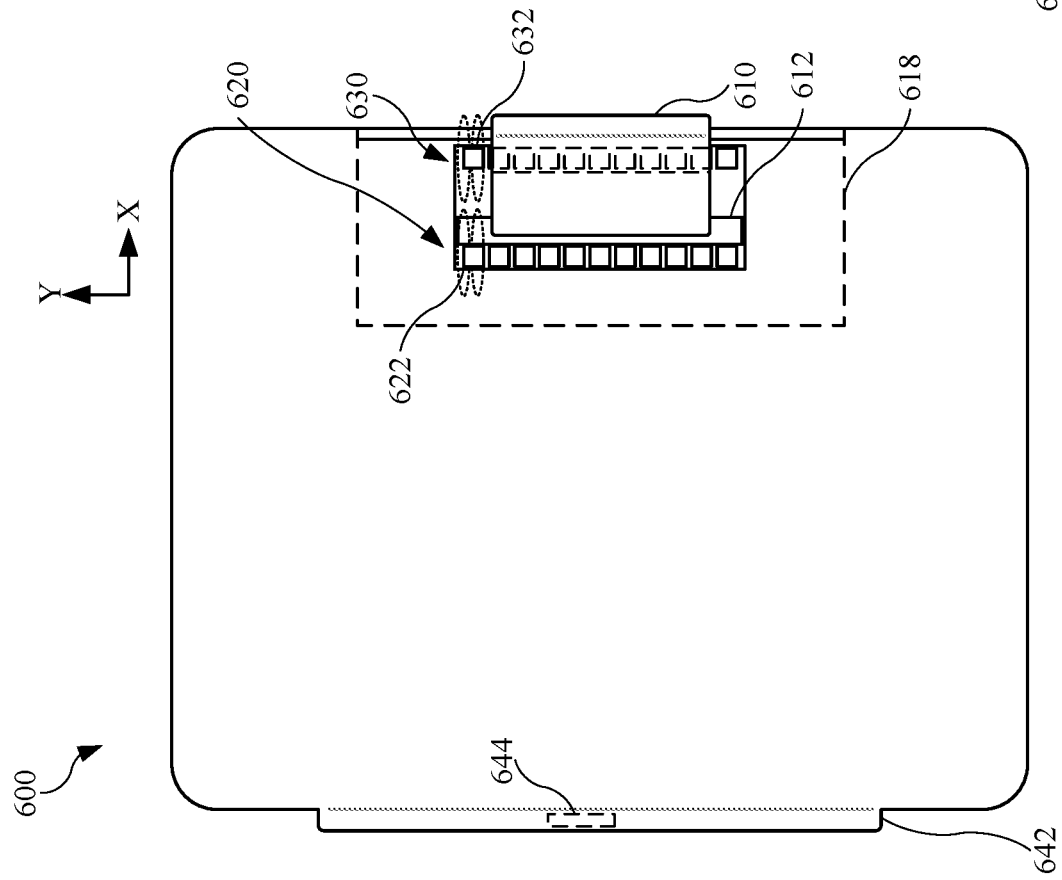
FIG. 10 illustrates a plan view the accessory device shown in FIG. 9, with the retaining feature in a stored configuration.

FIG. 10 illustrates the accessory device 600 with a retaining feature 610 positioned in a stored configuration. The internal view 618 of the accessory device 600 shows the accessory device 600 including a retaining feature 610 designed to receive an object, such as a stylus. As shown, the retaining feature 610 may be secured with a bar 612. Securing means between the retaining feature 610 and the bar 612 may include an adhesive. In some embodiments, the bar 612 is a magnet. In the embodiment shown in FIGS. 10 and 11, the bar 612 includes a ferrous material designed to magnetically attract to magnets. Generally, the bar 612 may be formed from any magnetically attractable material. The accessory device 600 may further include a first array 620 of magnets and a second array 630 of magnets, both of which are disposed in an opening of the accessory device 600 and may magnetically couple with the bar 612. The first array 620 of magnets and the second array 630 of magnets may be simply referred to as a first array 620 and a second array 630, respectively. The first array 620 and the second array 630 may be designed and positioned in the accessory device 600 such that each magnet in the respective arrays includes a magnetic field in an X-Y plane, that is, in the same or parallel plane as that of the accessory device 600 is lying. For example, FIG. 10 shows the first array 620 including a first magnet 622 having a magnetic field and the second array 630 including a first magnet 632 having a magnetic field, with the magnetic fields of the magnets shown in the X-Y plane. It will be appreciated that the first magnet 622 in the first array 620 and the first magnet 632 in the second array 630 are representative of the remaining magnets in the respective arrays. Also, the bar 612 may be positioned between and in the same plane as the first array 620 and the second array 630.

When the bar 612 is magnetically coupled with the first array 620, the retaining feature 610 is in the stored configuration as shown in FIG. 10, and a portion of the retaining feature 610 protrudes from the accessory device 600 such that a user may engage the retaining feature 610. However, as shown in FIG. 11, in response to the pulling force to the retaining feature 610 in a direction away from the accessory device 600 sufficient to overcome the magnetic circuit between the bar 612 and the first array 620, the magnetic coupling between the bar 612 and the first array 620 ceases, and the bar 612 moves in a direction toward the second array 630 and magnetically couples with the second array 630. In this configuration, the retaining feature 610 is positioned in a deployed configuration as shown in FIG. 11. The retaining feature 610 may return to the stored configuration by applying a force to the retaining feature 610 sufficient to overcome the magnetic circuit between the bar 612 and the second array 630.

Also, the first array 620 and the second array 630 may be positioned such that the bar 612 is magnetically coupled with either the first array 620 or the second array 630. For example, if the bar 612 is not magnetically coupled with the first array 620, then the bar 612 will be magnetically coupled with the second array 630, or vice versa. In this manner, the bar 612 will always be within a magnetic field generated by the first array 620 or a magnetic field generated by the second array 630. Also, in some embodiments, a magnetic field generated by at least one magnet in the first array 620 may overlap with a magnetic field generated by at least one magnet in the second array 630.

Also, as shown in FIGS. 10 and 11, the accessory device 600 may include an extension 642 that may include a size and a shape for positioning in another accessory device. In particular, the extension 642 may be designed to fit within, for example, the cut out region 108 of the second sidewall 106 of the accessory device 100 (shown in FIG. 1). In this manner, the accessory device 600 may be used in conjunction with the accessory device 100, with the accessory devices combining to cover and retain an electronic device. Further, in some embodiments, the extension 642 includes an electrical contact 644 designed to couple with an electronic device. As such, the electrical contact 644 may be disposed in a location of the extension 642 corresponding to a coupling feature of an electronic device. The coupling between the electrical contact 644 and the electronic device may allow for power distribution and/or data transmission between the electronic device and the accessory device 600. Also, although not shown, the electrical contact 644 may be coupled with one or more wires disposed within and routed throughout the accessory device 600. Also, the extension 642 and the electrical contact 644 may be included features in other embodiments of an accessory device described in this detailed description. Also, the retaining feature 610 may be referred as a retractable loop feature, as the retaining feature 610 forms a loop designed to retract into the accessory device 600 (as shown in FIG. 10), and then at least partially extend from the accessory device 600 (as shown in FIG. 11) to receive an object.

Figure 12:
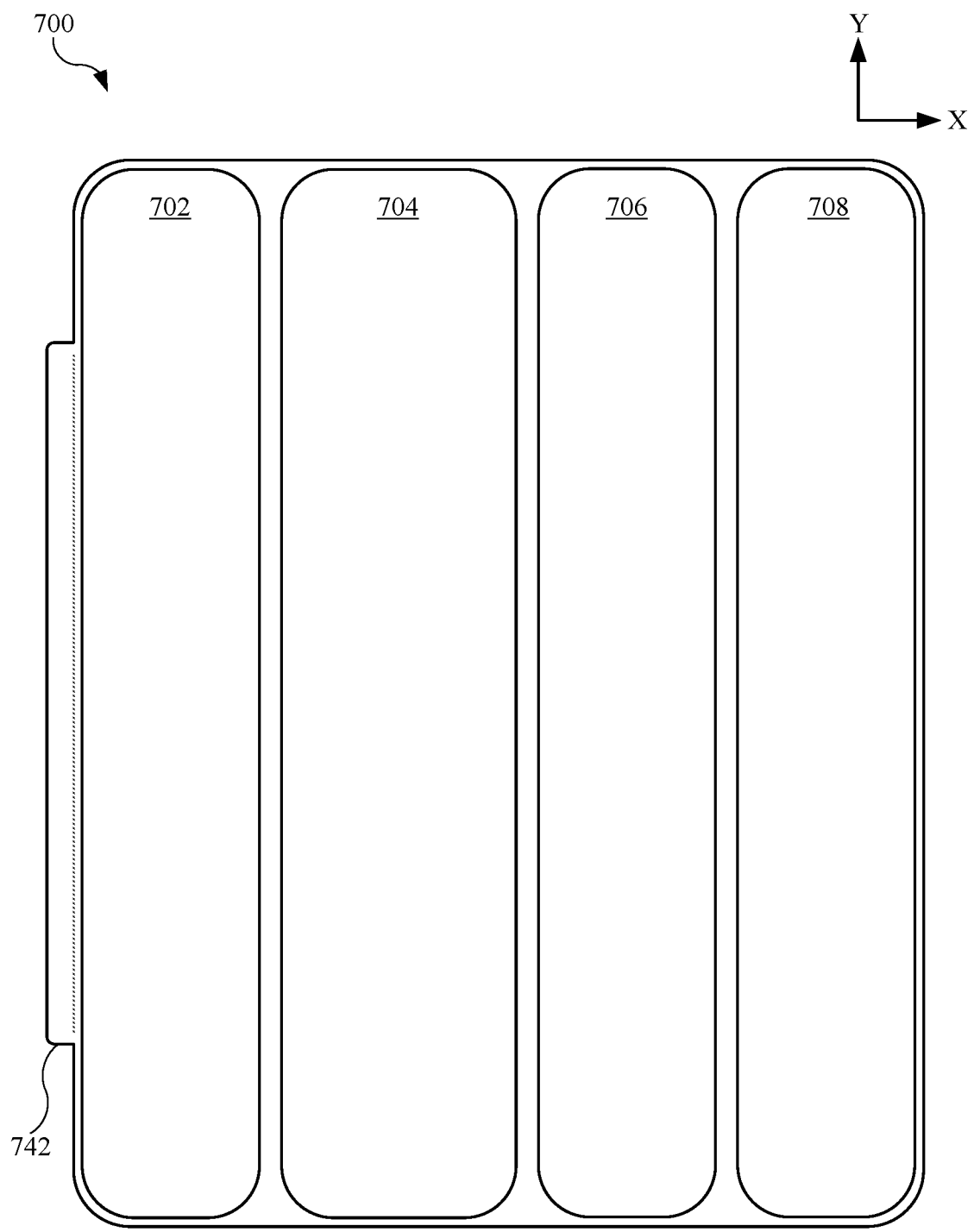
FIG. 12 illustrates a plan view of an alternate embodiments of an accessory device having multiple panels or segments, in accordance with the described embodiments.

In some embodiments, the accessory device may include several panels, or segments, each of which is capable of bending or folding with respect to the remaining panels. For example, FIG. 12 illustrates a plan view of an embodiment of an accessory device 700 used with an electronic device such as the electronic device 150 (shown in FIG. 2), in accordance with the described embodiments. As shown, the accessory device 700 may include a first panel 702, a second panel 704, a third panel 706, and a fourth panel 708. However, other embodiments may include any number of panels. Also, the panels may fold with respect to other panels to define a support structure capable of supporting an electronic device and an accessory device that retains the electronic device, such as the accessory device 100 shown in FIG. 1. In some embodiments, the fourth panel 708 includes a retaining feature substantially similar to the retaining feature 610 shown in FIGS. 10-11. Also, the accessory device 700 may include an extension 742 that may include any feature or features previously described for an extension of an accessory device.

Figure 13:
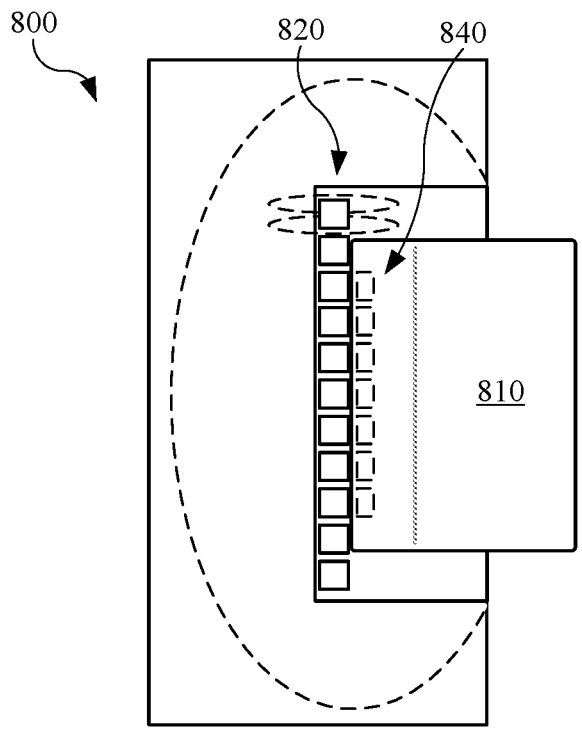
FIG. 13 illustrates a plan view showing an alternate embodiment of a retaining feature suitable for use with an accessory device, in accordance with the described embodiments.

The retaining feature previously described includes a retaining feature permanently coupled with an accessory device. However, in some embodiments, a retaining feature may be designed to completely detach from an accessory device. For example, FIG. 13 illustrates a plan view showing an alternate embodiment of a retaining feature 810 suitable for use with an accessory device 800, in accordance with the described embodiments. Only a portion of the accessory device 800 is shown. However, the accessory device 800 may be substantially similar size and shape as the accessory devices shown in FIGS. 9-12. Also, FIG. 13 represents a partial internal view of the accessory device 800. The accessory device 800 may include an array 820 of magnets disposed in an opening of the accessory device 800. Also, the retaining feature 810, designed to carry an object suitable for use with an electronic device, may include an array 840 of magnets disposed or embedded in the retaining feature 810, with the array 840 of magnets designed to magnetically couple with the array 820 of magnets in the accessory device 800 to define a stored configuration of the retaining feature 810, as shown in FIG. 13.

Figure 14:
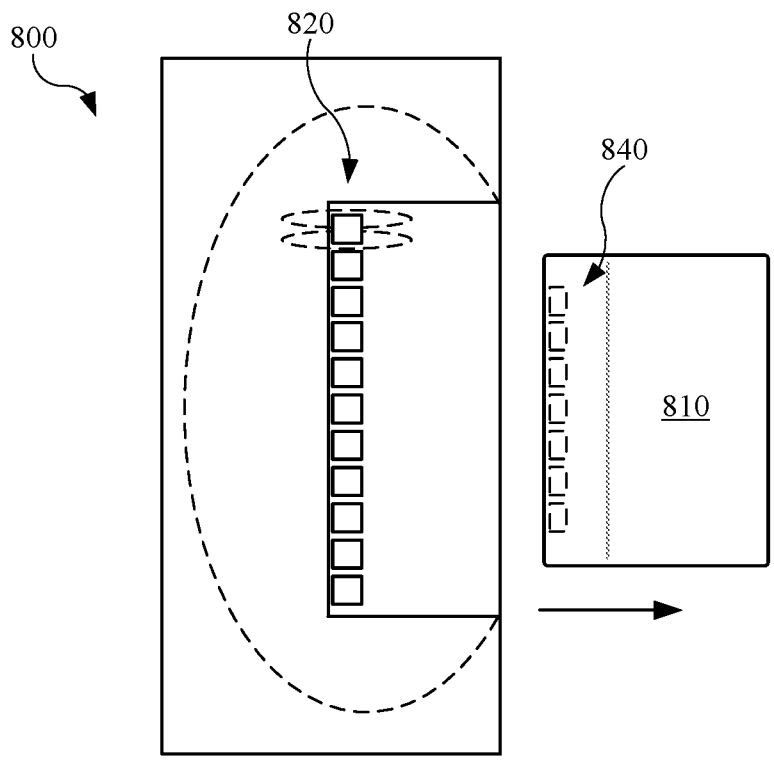
FIG. 14 illustrates a plan view of the retaining feature shown in FIG. 13, with the retaining feature detached from the accessory device.

However, in response to sufficient force to the retaining feature 810 in a direction away from the accessory device 800 to overcome the magnetic circuit between the array 820 and the array 840, the magnetic coupling between the array 840 of magnets in the retaining feature 810 and the array 820 ceases. For example, FIG. 14 illustrates a plan view of the retaining feature 810 shown in FIG. 13, with the retaining feature 810 detached from the accessory device 800. In particular, the retaining feature 810 is completely detached from the accessory device 800. The retaining feature 810 may again magnetically couple with the accessory device 800 by positioning the retaining feature 810 in or near the opening of the accessory device 800 to form a magnetic circuit between the array 820 of magnets in the accessory device 800 and the array 840 of magnetic in the retaining feature 810. Also, the retaining feature 810 may be referred as a retractable loop feature, as the retaining feature 810 forms a loop designed to retract into the accessory device 800 (as shown in FIG. 13), and then at least partially extend from the accessory device 800 (as shown in FIG. 14) to receive an object. Also, in contrast to previous embodiments, the retaining feature 810 may further be referred to as a removable loop feature as the retaining feature 810 may be completed detached from, but later reattached with, the accessory device 800.

In some cases, a material defining a retaining feature is in an "open" configuration and does not initially include a loop feature previously shown. This may allow the material to form a lower profile when disposed in an accessory device. However, the material may fold or deform to define a closed configuration such that the retaining feature may receive and carry an object.

Figure 15:
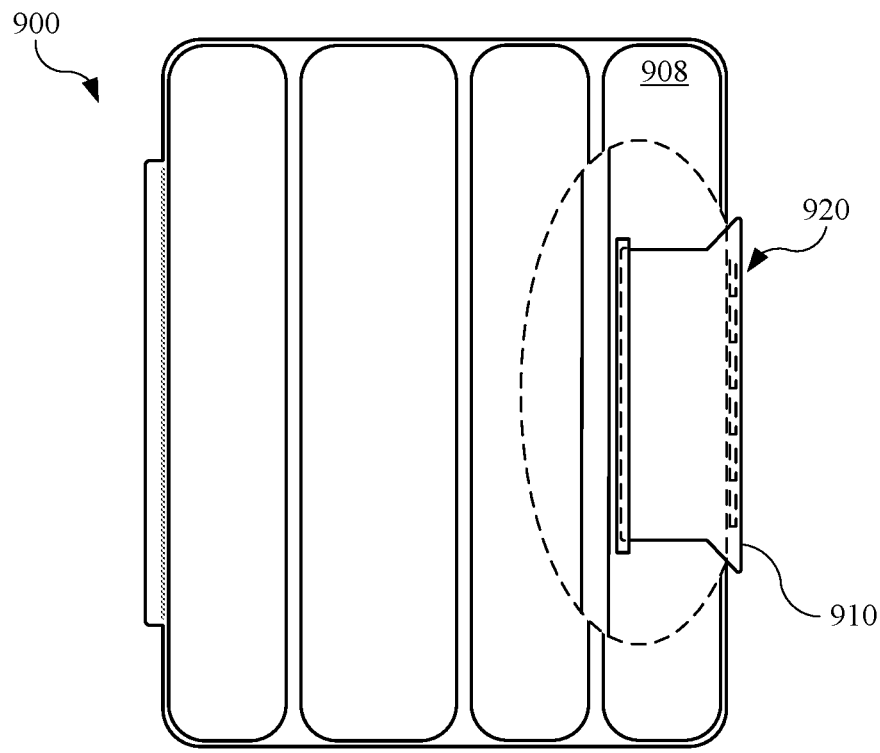
FIG. 15 illustrates a front plan view of an alternate embodiment of an accessory device used with an electronic device, in accordance with the described embodiments.

FIGS. 15-18 illustrates a retaining feature 910 in an accessory device 900, with the retaining feature 910 taking the form of an "open" configuration until the retaining feature 910 magnetically couples with the accessory device 900 to define a closed loop. FIG. 15 illustrates a front plan view of an alternate embodiment of an accessory device 900 used with an electronic device, in accordance with the described embodiments. Although the accessory device 900 includes a number of panels, in other embodiments, the accessory device 900 is a single piece flap similar to the flap 602 (shown in FIG. 9). The partial internal view of the accessory device 900 shows a panel 908 having a retaining feature 910 secured at one end with the panel 908. As shown, the retaining feature 910 is in a stored configuration. Further, the retaining feature 910, as shown in FIG. 15, may be in a retracted position as a majority of the retaining feature 910 is disposed in the accessory device 900. Also, the retaining feature 910 may include an array 920 of magnets disposed or embedded in the retaining feature 910. The array 920 of magnets is designed couple with one or more magnets or other metallic feature (or features) disposed in another location of the accessory device 900. This will be shown and described below.

Figure 16:
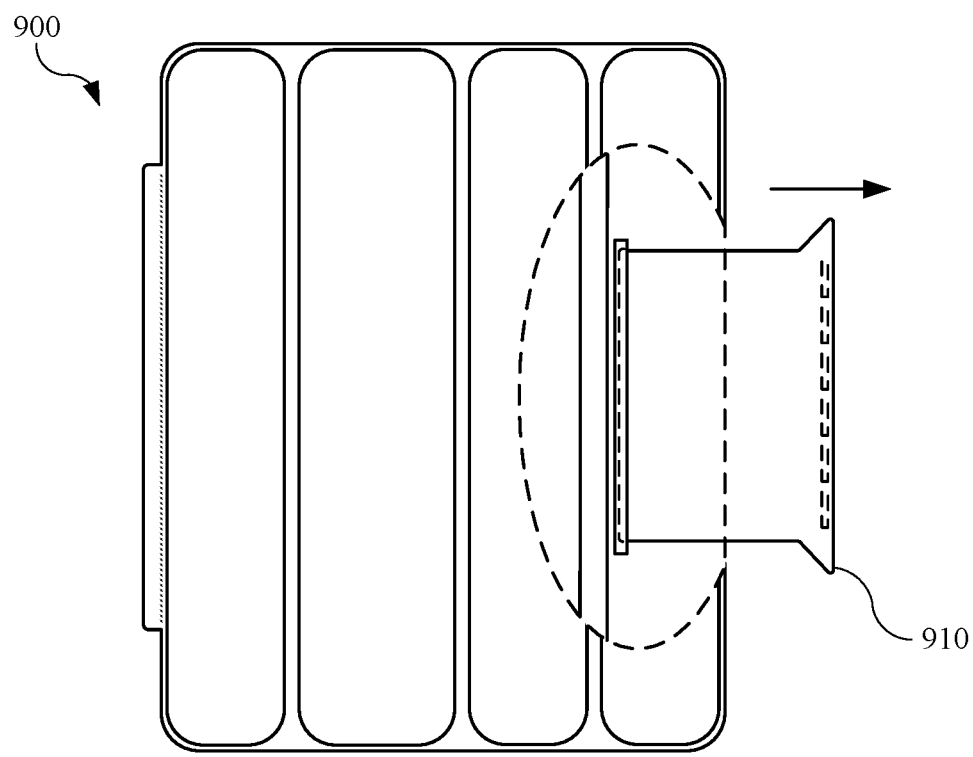
FIG. 16 illustrates the accessory device shown in FIG. 15, with the retaining feature expanding and extending from the accessory device in response to a force exerted on the retaining feature.

FIG. 16 illustrates the accessory device 900 shown in FIG. 15, with the retaining feature 910 expanding and extending from the accessory device 900 in response to a force exerted on the retaining feature 910. The retaining feature 910 is designed to expand and extend in response to a force applied to the retaining feature 910 in a direction away from the accessory device 900. In this regard, the retaining feature 910 may include a stretchable woven fabric designed to stretch in response to a pulling force and elastically return to its initial form once the pulling force is no longer applied. Also, as shown in FIG. 16, the retaining feature 910 may change from the retracted positioned to a deployed position in order to form a feature capable of holding an object (shown below).

Figure 17:
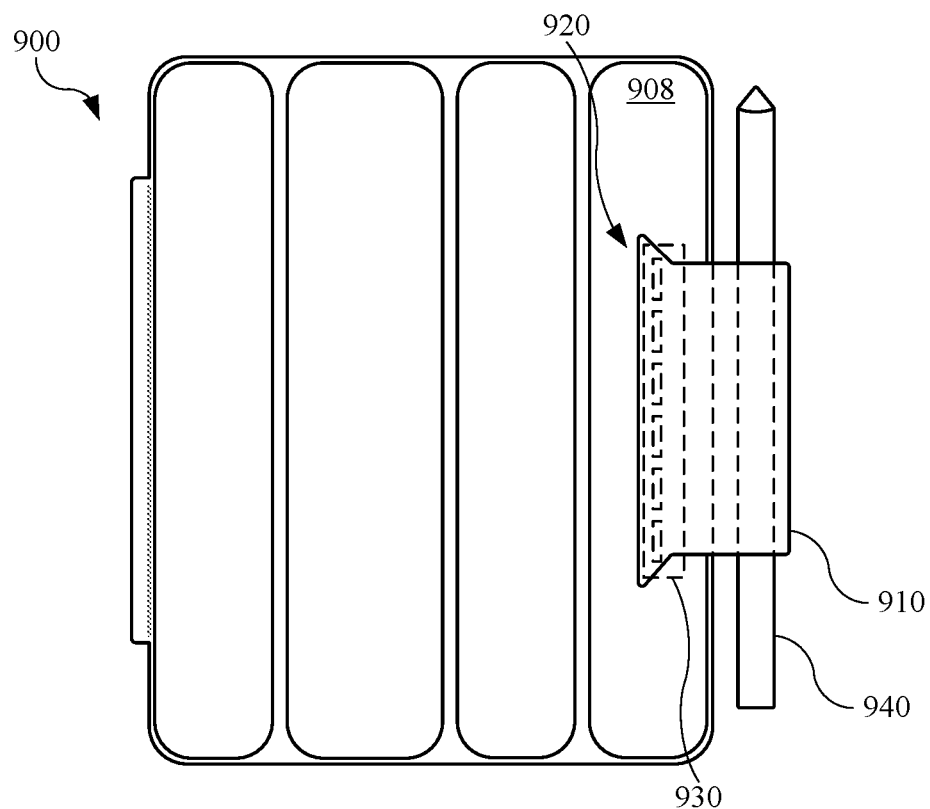
FIG. 17 illustrates a rear plan view of the accessory device shown in FIG. 15, with the retaining feature wrapping around an edge of the accessory device to secure with the accessory device.

FIGS. 15 and 16 show a front side of the accessory device 900 generally associated with an exterior region visible when the accessory device 900 is disposed over a display assembly of an electronic device. FIG. 17 illustrates a rear plan view showing the back, or rear side, of the accessory device 900 opposite the front side, with the retaining feature 910 wrapping around an edge of the accessory device 900. As shown, the retaining feature 910 is designed to bend or fold such that the array 920 of magnets in the retaining feature 910 magnetically couple with an attachment feature 930 of the accessory device 900. The attachment feature 930 may be also be a magnet or a metal designed to magnetically couple with the array 920 of magnets in the retaining feature 910. As shown, the attachment feature 930 is disposed in the panel 908 but could be disposed in other panels. Also, the attachment feature 930 may be embedded in the panel 908 and covered by the layers of the accessory device 900 such that the attachment feature 930 is hidden from view. When the array 920 of magnets magnetically couples with the attachment feature 930, the retaining feature 910 defines a closed configuration capable of receive an object 940. As shown, the object 940 is a stylus, but may be another object having a size and a shape that fits into the retaining feature 910.

Figure 18:
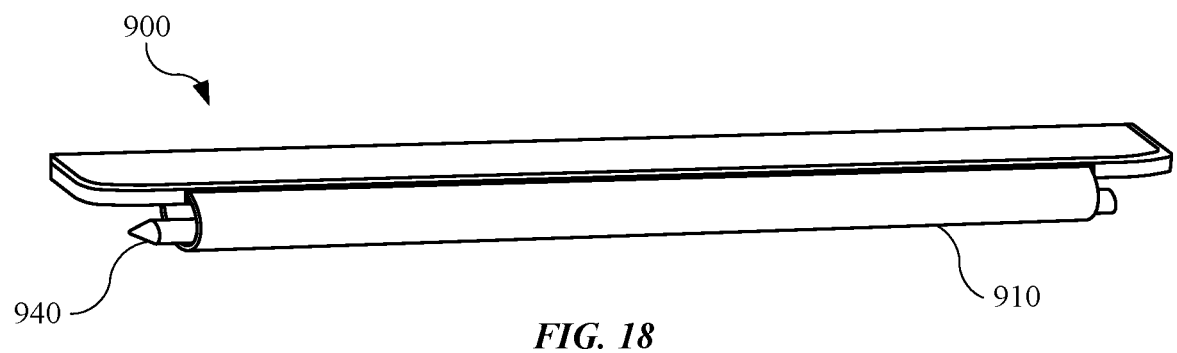
FIG. 18 illustrates a partial isometric view of the accessory device and the retaining feature.

FIG. 18 illustrates a partial isometric view of the accessory device 900 and the retaining feature 910, with the retaining feature 910 carrying the object 940. FIGS. 16-18 also illustrate the retaining feature 910 in a deployed configuration. However, when the array 920 of magnets is no longer magnetically coupled with the attachment feature 930, the retaining feature 910 may return to the stored configuration (shown in FIG. 15). Also, in other embodiments, the array 920 of magnets is replaced by a metal or an array of metal parts, and the attachment feature 930 is a magnet designed to magnetically couple with the metal replacing the array 920 of magnets.

The accessory device may yet take on other forms allowing the accessory device to include additional features. For example, the accessory device may include one or more features designed to input a control or command to an electronic device. Also, an accessory device may include mating features allowing the accessory device to couple with another accessory device.

Figure 19:
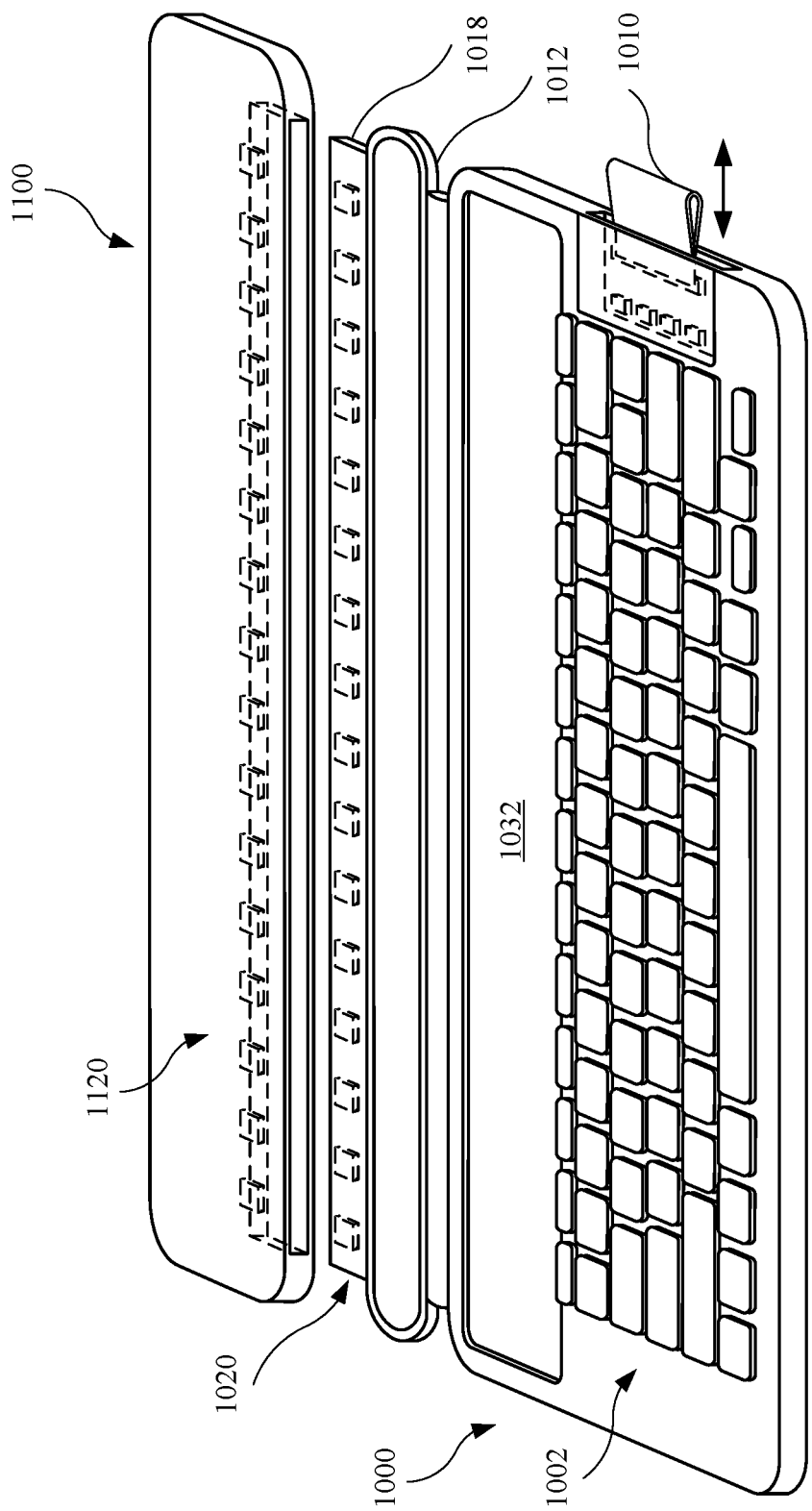
FIG. 19 illustrates an isometric view of an alternate embodiment of a first accessory device designed to couple with a second accessory device, in accordance with the described embodiments.

FIG. 19 illustrates an isometric view of an alternate embodiment of a first accessory device 1000 designed to couple with a second accessory device 1100, in accordance with the described embodiments. The first accessory device 1000 and the second accessory device 1100 may include features designed to couple the accessory devices together. Also, these features further allow the accessory devices to decouple with each other. In some embodiments, the first accessory device 1000 includes a keyboard 1002 designed for communication with an electronic device (such as the electronic device 150, shown in FIG. 1). The keyboard 1002 may be associated with a QWERTY configuration generally known in the art for a keyboard. Also, the keyboard 1002 may include a size and a shape that covers a display of the electronic device. The coupling features shown in FIG. 19 may define a wired communication between the keyboard 1002 and an electronic device. However, alternatively, the keyboard 1002 may be in wireless communication with the electronic device via Bluetooth protocol, as an example. Also, the first accessory device 1000 may include a flexible panel 1012. The flexible panel 1012 may include an extension 1018 having a first array 1020 of magnets, both of which are designed to enter an opening of the second accessory device 1100 and magnetically couple with a second array 1120 of magnets disposed in the second accessory device 1100. In other embodiments, the second array 1120 of magnets is replaced by a metal magnetically attracted to the first array 1020 of magnets in the first accessory device 1000. Also, the second accessory device 1100 may be a panel or portion of an additional accessory device (not shown). Also, the first accessory device 1000 and the second accessory device 1100 may be designed such that the keyboard 1002 is in communication with a device (not shown) coupled with the second accessory device 1100 when the first accessory device 1000 is magnetically coupled with the second accessory device 1100.

The first accessory device 1000 may include additional features. For example, the first accessory device 1000 may include a retaining feature 1010 designed to carry an object, such as a stylus. The retaining feature 1010 may include any one or more feature previously described for a retaining feature. As shown in FIG. 19, the first accessory device 1000 includes a retaining feature 1010 that is detachable from the first accessory device 1000 in a manner similar to that shown in FIGS. 10 and 11, or FIGS. 13 and 14. Also, the retaining feature 1010 and accompanying features may be positioned in other side regions of the first accessory device 1000. Also, the first accessory device 1000 may include a recessed region 1032 designed to receive the second accessory device 1100 for compact storage.

Figure 20:
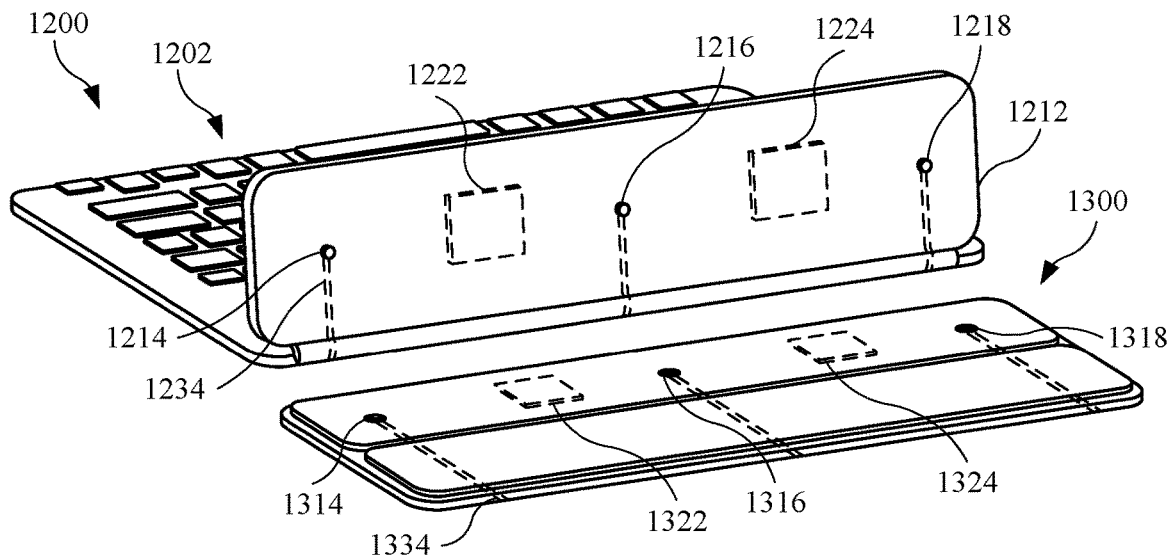
FIG. 20 illustrates an isometric view of an alternate embodiment of a first accessory device designed to couple with a second accessory device, in accordance with the described embodiments.
Figure 21:
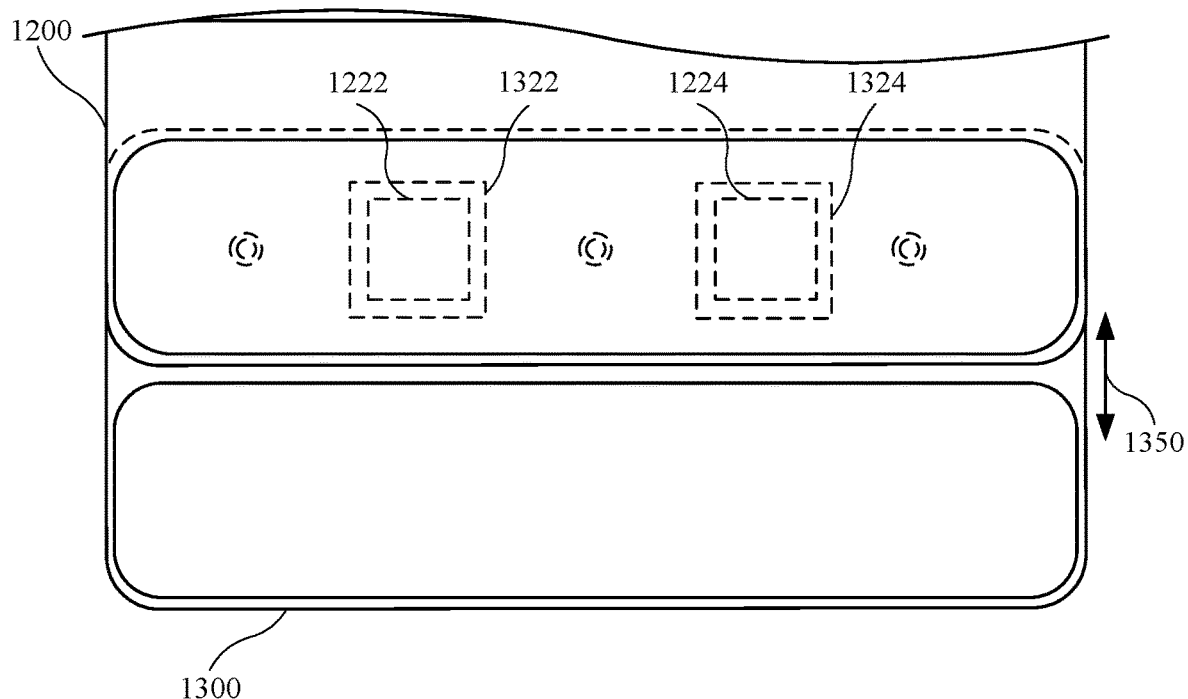
FIG. 21 illustrates a plan view of the first accessory device and second accessory device shown in FIG. 20, with the first accessory device coupled with the second accessory device.

FIG. 20 illustrates an isometric view of an alternate embodiment of a first accessory device 1200 designed to couple with a second accessory device 1300, in accordance with the described embodiments. The second accessory device 1300 may be a panel or another portion of an additional accessory device. As shown, the first accessory device 1200 includes a keyboard 1202 having a similar configuration to that of the keyboard 1002 (in FIG. 19) and capable of wireless communication with an electronic device. Also, the first accessory device 1200 may further include a flexible panel 1212 having several pins. For example, the flexible panel 1212 may include a first pin 1214, a second pin 1216, and a third pin 1218. The second accessory device 1300 may include a first opening 1314, a second opening 1316, and a third opening 1318 designed to receive the first pin 1214, the second pin 1216, and the third pin 1218, respectively. This allows the first accessory device 1200 to couple with the second accessory device 1300 and resist decoupling forces in a lateral direction. For example, FIG. 21 illustrates a plan view of the first accessory device 1200 and second accessory device 1300 shown in FIG. 20, with the first accessory device 1200 coupled with the second accessory device 1300. As shown, the pins are disposed in the openings, and the first accessory device 1200 and second accessory device 1300 may remain coupled in response to a decoupling force in a lateral direction denoted by the arrows 1350. Also, as illustrated in FIGS. 20 and 21, the flexible panel 1212 may be a foldable extension as the flexible panel 1212 is designed to pivot or rotate about a hinge feature between the keyboard 1202 and the flexible panel 1212.

Returning to FIG. 20, the flexible panel 1212 may further include a first magnet 1222 and a second magnet 1224 disposed in the flexible panel 1212. Also, the second accessory device 1300 may include a first magnet 1322 and a second magnet 1324 designed to magnetically couple with the first magnet 1222 and the second magnet 1224, respectively. In this manner, the first accessory device 1200 may be further secured with the second accessory device 1300 by way of magnetic circuits. Also, the first magnet 1222 and the second magnet 1224 may be part of an array of magnets disposed in the flexible panel 1212.

FIG. 21 further shows the magnets of the first accessory device 1200 magnetically coupled with the magnets of the second accessory device 1300. For example, a first magnetic circuit may be formed between the first magnet 1222 in the flexible panel 1212 and the first magnet 1322 in the second accessory device 1300, and a second magnetic circuit may be formed between the second magnet 1224 in the flexible panel 1212 and the second magnet 1324 in the second accessory device 1300. By applying a force to the first accessory device 1200 in a direction perpendicular to the lateral direction denoted by the arrows 1350, the first accessory device 1200 may decouple from the second accessory device 1300. Alternatively, either the magnets in the flexible panel 1212 or the magnets in the second accessory device 1300 may be replaced by a metal having a magnetically attractable material, such as steel.

Also, referring again to FIG. 20, one or more of the pins of the flexible panel 1212 may be metal pins coupled with wires in electrical communication with the keyboard 1202. Further, the openings of the second accessory device 1300 include a terminal or connector that receive the metal pins. For example, as shown, a first wire 1234 is electrically coupled with the first pin 1214, and the first wire 1234 may extend into the first accessory device 1200 including the keyboard 1202. Also, the first opening 1314 of the second accessory device 1300 includes a first connector designed to receive the first pin 1214, with the first connector electrically coupled with a first wire 1334 disposed in the second accessory device 1300. These terminals or connectors may also be coupled with wires electrically coupled with another device, such as another electronic device and/or a charging device. In this manner, the first accessory device 1200 may be in electrical communication with an additional electronic device, such as a tablet device or other electronic device, with the first accessory device 1200 capable of sending and and/or receiving data transmission as well as receiving electrical power to charge a battery (not shown) in the first accessory device 1200.

In addition, the first accessory device 1200 may include a retaining feature having one or more features of a retaining feature previously described. For example, the first accessory device 1200 may include a retaining feature (not shown) disposed in a side region near the keyboard 1202, similar to the retaining feature 1010 shown in FIG. 19.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for a portable electronic device, the accessory device comprising:
   a rear wall that defines a receiving surface for the portable electronic device;
   sidewalls extending from, and combining with, the rear wall to form an internal volume for the portable electronic device; and
   a retaining feature secured to a sidewall of the sidewalls, the retaining feature capable of carrying an object, wherein when the portable electronic device is disposed against the receiving surface:
      a first configuration comprises the retaining feature disposed in the internal volume and covered by the portable electronic device, the sidewall, and the rear wall, and
      a second configuration comprises the retaining feature extending away from the sidewall.

2. The accessory device of claim 1, wherein the retaining feature comprises a flexible loop.

3. The accessory device of claim 1, wherein the sidewall lacks openings in a location corresponding to the retaining feature.

4. The accessory device of claim 1, further comprising a recess in at least the sidewall, wherein the first configuration comprises the retaining feature positioned in the recess.

5. The accessory device of claim 1, further comprising a fabric layer disposed on at least the sidewall, the fabric layer comprising an opening through which the retaining feature extends.

6. The accessory device of claim 5, wherein the retaining feature comprises a loop that is secured with the sidewall by an adhesive, and wherein the fabric layer covers the adhesive.

7. The accessory device of claim 1, further comprising a recess formed in the rear wall, wherein the first configuration comprises the retaining feature positioned in the recess.

8. An accessory device for a portable electronic device, the accessory device comprising:
   an enclosure that includes an interior region having a size and a shape to receive and carry the portable electronic device, the enclosure having i) a bottom wall that defines a receiving surface for the portable electronic device, and ii) a sidewall extending from the bottom wall; and
   a retaining feature attached with the enclosure at the sidewall, the retaining feature having a size and a shape to receive and carry an object, wherein the retaining feature is configured to at least partially extends into the interior region when the portable electronic device engages the receiving surface, and wherein the retaining feature comprises material secured by an adhesive layer to form a loop capable of carrying the object.

9. The accessory device of claim 8, wherein when the enclosure carries the portable electronic device in the interior region, the retaining feature is at least partially positioned between the portable electronic device and the sidewall.

10. The accessory device of claim 8, wherein the retaining feature comprises a magnetically attractable material capable of magnetically coupling with the object.

11. The accessory device of claim 8, wherein the retaining feature comprises:
    a woven fabric; and
    a polymeric material laminated over the woven fabric.

12. The accessory device of claim 8, wherein the sidewall lacks openings in a location corresponding to the retaining feature.

13. The accessory device of claim 8, further comprising a recessed region formed in at least the sidewall, wherein when the portable electronic device is positioned in the interior region and the retaining feature is positioned in the recessed region, the retaining feature is hidden from view by the portable electronic device and the enclosure.

14. An accessory device for a portable electronic device, the accessory device comprising:
    a bottom wall;
    a sidewall extending from the bottom wall;
    a loop secured with the sidewall by an adhesive, the loop configured to receive an object suitable for use with the portable electronic device; and
    a fabric layer disposed on at least the sidewall and covering the adhesive, the fabric layer comprising an opening through which the loop extends.

15. The accessory device of claim 14, wherein the loop comprises a magnetically attractable material capable of magnetically coupling with the object.

16. The accessory device of claim 14, wherein the loop is permanently secured to the sidewall by the adhesive.

17. The accessory device of claim 14, wherein when portable electronic device is disposed against the bottom wall:
    a first configuration comprises the loop covered by the portable electronic device, the sidewall, and the bottom wall; and
    a second configuration comprises the loop extending away from the sidewall.

18. The accessory device of claim 17, further comprising a recess formed in at least the sidewall, wherein the first configuration comprises the loop positioned in the recess.

19. The accessory device of claim 17, wherein the second configuration comprises the loop being at least partially positioned between the portable electronic device and the sidewall.

20. The accessory device of claim 8, wherein the enclosure comprises a microfiber layer.

* * * * *